US009779621B1

(12) United States Patent
Urmson et al.

(10) Patent No.: US 9,779,621 B1
(45) Date of Patent: Oct. 3, 2017

(54) INTERSECTION PHASE MAP

(71) Applicant: Waymo LLC, Mountain View, CA (US)

(72) Inventors: Chris Urmson, Mountain View, CA (US); Bradley Templeton, Sunnyvale, CA (US); Anthony Levandowski, Berkeley, CA (US); Eric Teller, Palo Alto, CA (US); Brian Cullinane, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 43 days.

(21) Appl. No.: 15/060,346

(22) Filed: Mar. 3, 2016

Related U.S. Application Data

(63) Continuation of application No. 13/834,354, filed on Mar. 15, 2013, now abandoned.

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |
| ***G08G 1/01*** | (2006.01) |
| ***G08G 1/048*** | (2006.01) |

(52) U.S. Cl.
CPC ......... *G08G 1/0141* (2013.01); *G08G 1/0125* (2013.01); *G08G 1/048* (2013.01)

(58) Field of Classification Search
CPC ............................... G08G 1/0104; G08G 1/00
USPC ........................... 701/117–119; 340/909–910
See application file for complete search history.

(56) References Cited

U.S. PATENT DOCUMENTS

2002/0036571 A1* 3/2002 Takahashi ................ G08G 1/09 340/901
2007/0118280 A1* 5/2007 Uhlmann ................ B61L 29/24 701/409
2009/0212973 A1* 8/2009 Namikawa ............... G08G 1/07 340/909
2010/0100324 A1* 4/2010 Caminiti .............. G08G 1/0104 701/301
2012/0161982 A1* 6/2012 Musachio ................ G08G 1/07 340/932
2012/0242505 A1* 9/2012 Maeda ................... G08G 1/164 340/905

* cited by examiner

*Primary Examiner* — Imran Mustafa
(74) *Attorney, Agent, or Firm* — McDonnell Boehnen Hulbert & Berghoff LLP

(57) ABSTRACT

Methods and apparatus are disclosed for providing information about road features. A server can receive reports from information sources associated with a road feature that can include a road intersection. Each report can include source data obtained at a respective time. The source data from the reports can be stored at the server. The server can construct a phase map, where the phase map is configured to represent a status of the road feature at one or more times. The server can receive an information request related to the road feature at a specified time. In response to the information request, the server can generate an information response including a prediction of a status related to the road feature at the specified time. The prediction can be provided by the phase map and is based on information request. The information response can be sent from the server.

12 Claims, 12 Drawing Sheets

INTERSECTION PHASE MAP

CROSS-REFERENCE TO RELATED APPLICATION

This patent application is a continuation of U.S. application Ser. No. 13/834,354 which was filed on Mar. 15, 2013, the contents of which are entirely incorporated herein by reference as if fully set forth in this application.

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle can use the sensed information to navigate through the environment. For example, if the sensors sense that the vehicle is approaching an obstacle, the vehicle can navigate around the obstacle.

SUMMARY

In a first appearance, a method is provided. A server receives one or more reports from a plurality of information sources associated with a road feature. Each respective report includes source data indicative of one or more aspects of the road feature at a respective time. The road feature includes a road intersection. At least the source data from the one or more reports is stored at the server. The server constructs a phase map for the road feature from at least the source data. The phase map is configured to represent a status of the road feature at one or more times. The server receives an information request related to the road feature at a specified time. In response to the information request, the server generates an information response including a prediction of a status related to the road feature at the specified time. The prediction is provided by the phase map and is based on the information request. The information response is sent from the server.

In another appearance, an article of manufacture including a non-transitory computer readable medium having stored thereon program instructions is provided. The program instructions, upon execution by a computing device, cause the computing device to perform operations. The operations include: (a) receiving one or more reports from a plurality of information sources associated with a road feature, each respective report including source data indicative of one or more aspects of the road feature at a respective time, where the road feature includes a road intersection, (b) storing at least the source data from the one or more reports, (c) constructing a phase map for the road feature from at least the source data using the server, where the phase map is configured to represent a status of the road feature at one or more times, (d) receiving an information request related to the road feature at a specified time, (e) in response to the information request, generating an information response including a prediction of a status related to the road feature at the specified time, where the prediction is provided by the phase map and is based on the information request, and (f) sending the information response.

In yet another appearance, a server is provided. The server includes a processor and a non-transitory computer-readable storage medium. The non-transitory computer-readable storage medium stores at least source data, a phase map and instructions. The instructions, when executed by the processor, cause the server to perform operations. The operations include: (a) receiving one or more reports from a plurality of information sources associated with a road feature, each respective report comprising source data indicative of one or more aspects of the road feature at a respective time, where the road feature includes a road intersection, (b) storing at least the source data from the one or more reports, (c) constructing the phase map for the road feature from at least the source data, where the phase map is configured to represent a status of the road feature at one or more times, (d) receiving an information request related to the road feature at a specified time, (e) in response to the information request, generating an information response including a prediction of a status related to the road feature at the specified time, where the prediction is provided by the phase map and is based on the information request, and (f) sending the information response.

The foregoing summary is illustrative only and is not intended to be in any way limiting. In addition to the illustrative aspects, appearances, embodiments, and features described above, further aspects, appearances, embodiments, and features will become apparent by reference to the figures and the following detailed description.

DETAILED DESCRIPTION

Overview

Figure 1:
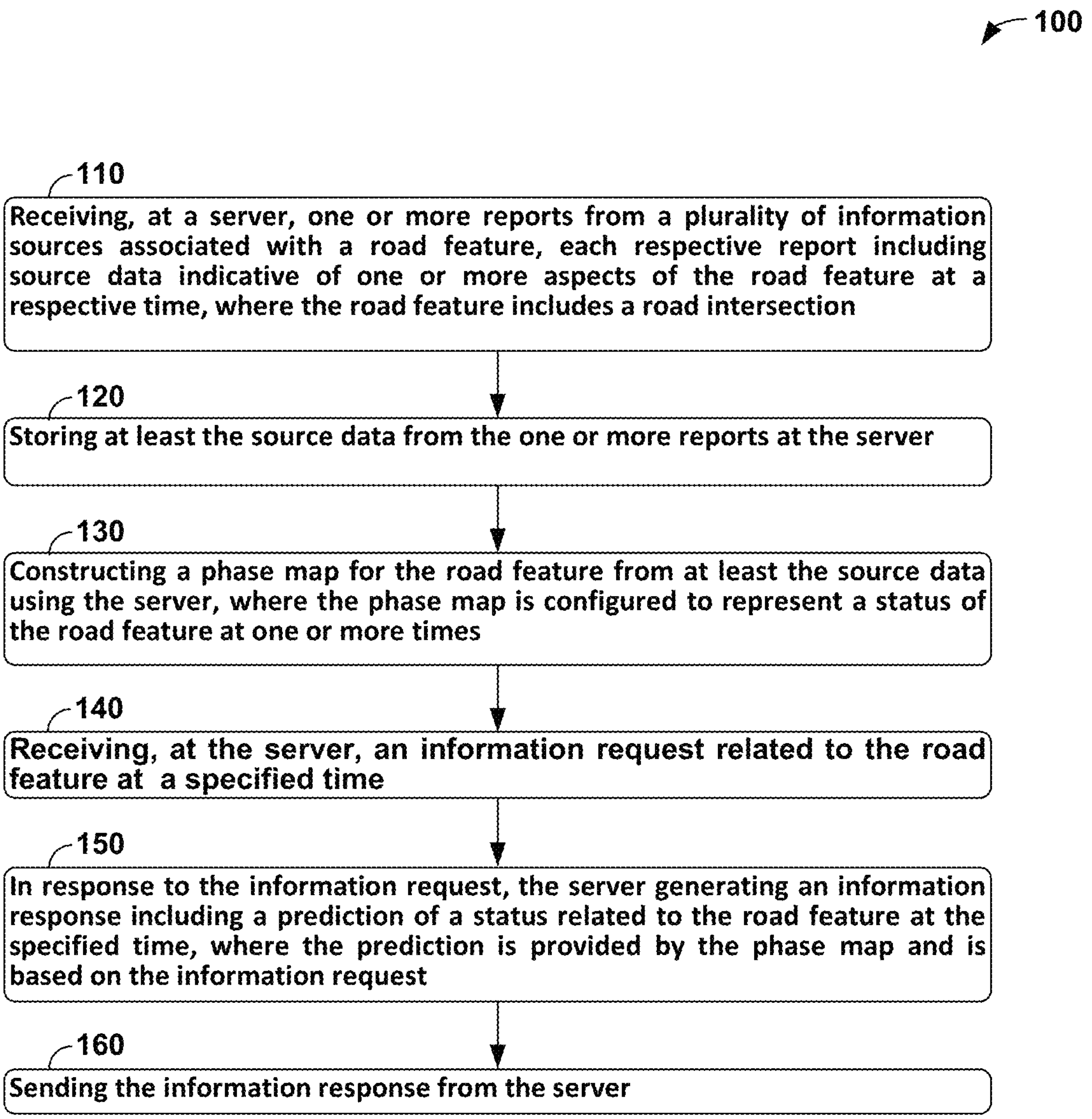
FIG. 1 is a flow chart of a method, according to an example embodiment.

Example embodiments disclosed herein relate to methods and systems for gathering information about "road features", such as, but not limited to, part or all of a road, road intersections, bridges, tunnels, interchanges/junctions, road/railroad intersections, entrances to roads (e.g., on-ramps), exits from roads (e.g., off-ramps), and "condition features" related to road features, such as, but not limited to traffic conditions, construction-related conditions, weather-related conditions, and accident-related conditions. The information about road features and condition features can be gathered using "information sources" that are on, near, or otherwise related to one or more of the road features. These information sources can include, but are not limited to: vehicles, mobile devices carried by pedestrians, "signals", such as traffic signals or traffic lights, crosswalk timers, and traffic signal timers. Information sources can provide information about a road, road features, motor vehicles, non-motor vehicles (e.g., bicycles), pedestrians, signals and signal timers. Condition features can include information about a status of a road feature at a time—e.g., an open road, an intersection with permitting traffic to move north/south, but not east/west, an icy bridge—and/or a status of an information source; e.g., a yellow traffic signal, a pedestrian walking north. In general, an "aspect" is a term for a road feature, condition feature, or information source; e.g., aspects include a portion of a road, the status of the road at 5 PM, a truck near the road, and/or the status of the truck, such as idle, moving, traveling west at 30 kilometers/hour, etc.

An information source can send one or more reports about a road feature to a "relaying server" that generates a representation of the road feature termed a "phase map" of the road feature from the data from the one or more reports. The phase map can include computer software and/or hardware configured at least to retrieve the stored data from the one or more reports and to generate the representation of the road feature. The phase map can provide responses to queries associated with a road feature, condition feature, information source, trends, and/or based on other associations. These queries can include requests about behavior of the road feature (or condition feature, information source, etc.) at one or more specific times; e.g., a time or time range involving past time(s), a current time, and/or future time(s). That is, the requests can include predictions of future behavior of the road feature, requests to monitor status of the road feature at the current time, and/or requests for retrieval of information about past behavior of the road feature. Other types of queries and/or to the phase map are possible as well.

Data stored in the phase map is considered to be time sensitive, that is, in some contexts, responses to queries can be based on data that is no older than a threshold age. For example, information about vehicles at an intersection that is several hours old is not likely to indicate the current status of the intersection. However, data older than the threshold age can be retained in the phase map so that the phase map can determine trends about the road and condition features; e.g., signal patterns, traffic flows at intersections and/or on roads during specific times of the day/days of the week, trends on accident occurrences at a location, average vehicle speed on an road during a given time of day, etc.

The relaying server can, upon request, provide information from the phase map to one or more "information consumers" (e.g., vehicles, mobile devices, other information sources) that can benefit from a better understanding of the road features. For example, an information consumer can send a query to the relaying server, which can pass the query on to the phase map as necessary. Based on any results provided by the phase map, the relaying server can provide a query response, such as a report, to the information source that sent the query.

In some embodiments, the phase map can store data beyond data available to an individual driver. For example, the phase map can maintain one or more "snapshots" of a given road feature, or a state that thoroughly describes a given road feature at a specific time based on a combination of source data in reports from a plurality of information sources about aspect(s) of the given road feature.

Example queries can include a "GetReports" query to get all reports about one or more pre-determined aspects for some amount of time. Reports can be "aged out" or subject to time and/or constraints. Aging out can happen directly or indirectly. As an example of direct aging out, a first report can be received that indicates a pedestrian P is at an intersection of $1^{st}$ and Main Streets and is headed toward $2^{nd}$ St. Then, a later report can indicate that P is on Main St. halfway between $1^{st}$ and $2^{nd}$ Streets. As the pedestrian has moved past the intersection of 1st and Main Streets, the first report about pedestrian P can be aged out and no longer reported.

As an example of indirect aging out, suppose first reports indicate a vehicle V is reported stopped on Main St. near the intersection of $1^{st}$ and Main Streets and that a traffic signal on Main St. is red. Later, a second report(s) indicate that the traffic signal on Main St. is green and V is moving on Main St. at 15 miles/hour. As V has moved to some yet unknown location, the phase map and/or relaying server can infer that V is no longer near the intersection of $1^{st}$ and Main Streets, and indirectly age out the first reports about vehicle V.

Another example type of query can be a "ClearPath" query to indicate whether a proposed path is or will be free of obstructions. Yet another example type of query can be a "PredictSignal" query to predict which light of a traffic signal (e.g., red, green, or yellow) will be active at a given time. Other types of reports are possible as well.

This use of phase maps and relaying servers can, thus, increase the knowledge available to information sources interested in the road(s) and/or road feature(s) modeled by the phase map. Knowledge from the phase map can be used to augment vehicle behavior during autonomous driving or to alert the driver of an impending situation. Vehicles and other entities can apply the knowledge provided by the phase maps to operate more efficiently, safely, and cooperatively.

Example Operations

FIG. 1 is a flow chart of method 100, according to an example embodiment. Method 100 begins at block 110, where a server can receive one or more reports from a plurality of information sources that are associated with a road feature. Each respective report can include source data indicative of one or more aspects of the road feature at a respective time. The road feature can include a road intersection.

In some embodiments, the one or more reports additionally can include information about a condition feature associated with the road feature. The condition feature includes at least one condition selected from the group consisting of: a traffic condition, a construction condition, a weather-related condition, and an accident-related condition. In other embodiments, the source data can include data selected from the group consisting of: data about a vehicle, data about a pedestrian, data about a traffic signal, data about road construction, data about a timer associated with the intersection, and data about a blockage of the intersection.

At block 120, the server can store at least the source data from the one or more reports.

At block 130, the server can construct a phase map for the road feature from at least the source data. The phase map can be configured to represent a status of the road feature at one or more times.

At block 140, the server can receive an information request related to the road feature at a specified time.

At block 150, in response to the information request, the server can generate an information response including a prediction of a status related to the road feature at the specified time. The information response can be provided by the phase map and can be based on the information request.

In some embodiments, the at least one information source of the plurality of information sources can include a signal, and the prediction of the status related to the road feature can include a predicted red/yellow/green-light status of the signal at the specified time. In other embodiments, the prediction of the status related to the road feature can include a prediction of whether the at least one information source is in a path at the specified time, where the path is associated with the road feature.

In yet other embodiments, generating the information response to the information request can include: (i) obtaining one or more data items from the source data and (ii) for each data item of the one or more data items: (a) determining an age of the data item, (b) comparing the age of the data item to a threshold age, and (c) in response to the age of the data item being less than the threshold age, using the data item to determine the response data. In particular embodiments, the threshold age can be based on the road feature. In more particular embodiments, the road feature is associated with a traffic signal, where the traffic signal is configured to sequence through a series of signals during a predetermined traffic-cycle time, and where the threshold age is based on the traffic-cycle time.

At block 160, the server can send the information response.

Example Scenarios and Use Cases of Phase Maps

Figure 2A:
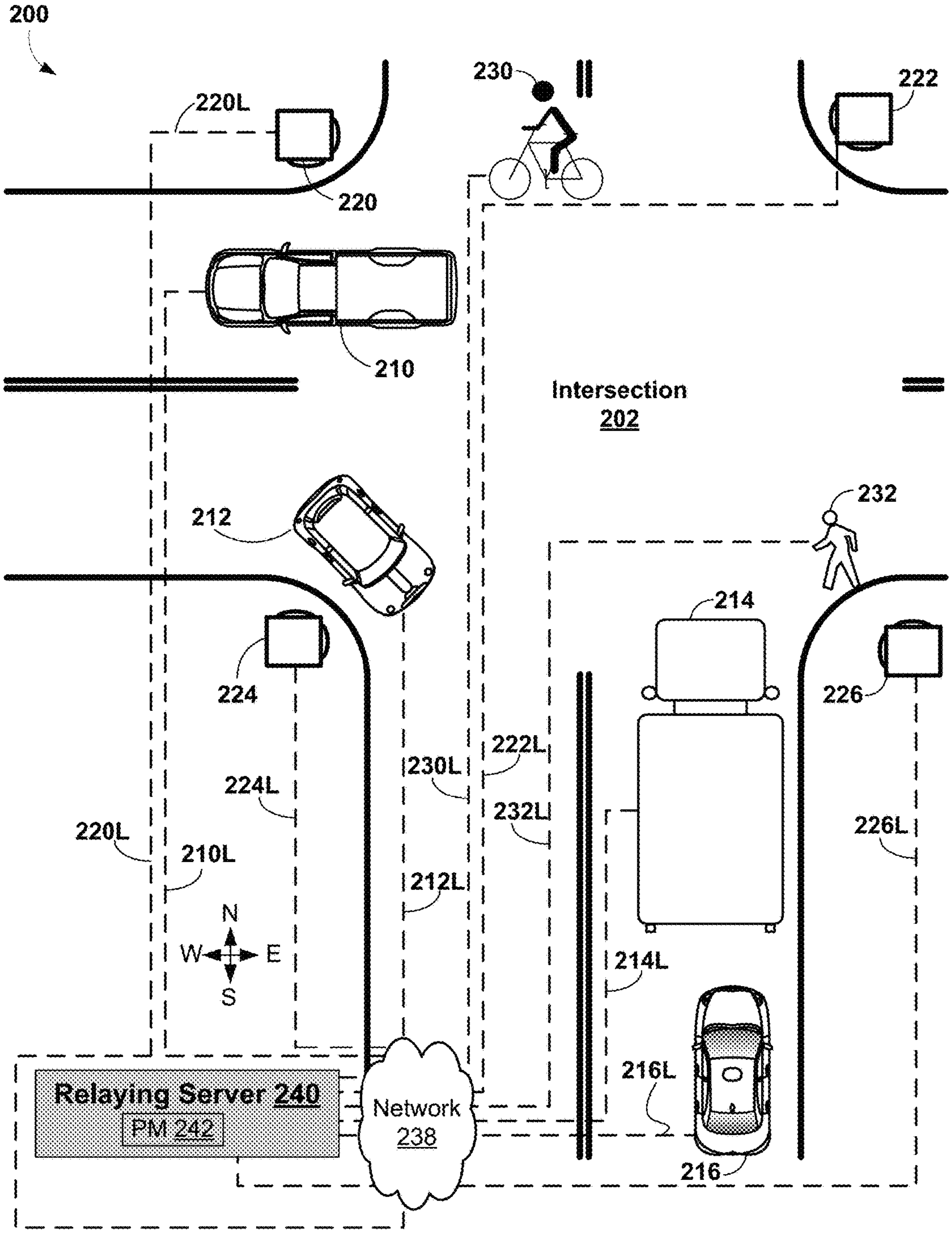
FIG. 2A shows an example scenario with motor vehicles, traffic signals, a bicycle, and a pedestrian present at an intersection, in accordance with an example embodiment.

FIG. 2A shows an example scenario 200 with motor vehicles 210, 212, 214, 216, traffic signals 220, 222, 224, 226, bicycle 230, and pedestrian 232 present at intersection 202, in accordance with an example embodiment. Each aspect 210-216, 220-226, 230, and 232 in intersection 202 during scenario 200 is communicatively linked via respective links 210L-216L, 220L-126L, 230L, and 232L to relaying server 240. As such, each aspect can provide reports, perhaps including source data, send information requests, and receive information responses via its link to relaying server 240. At relaying server 240, a report or an information response can be an input to phase map 242 that models intersection 202.

In scenario 200, some of motor vehicles 210, 212, 214, and 216 can be configured with sensors that gather data about intersection 202. For example, motor vehicle 214 can be configured with camera(s) that capture signal data about some or all of traffic signals 220, 222, 224, and 226. This signal data can include data such as, but not limited to red/yellow/green light status, walk/don't walk signal status, crosswalk timer values, and/or flashing/not-flashing light data. After capturing this data, motor vehicle 214 can generate a report about the status of one or more traffic signals. An example report about traffic signal 222 can include information about motor vehicle 214 such as an identifier and/or location information for motor vehicle 214, information about traffic signal 212, such as an identifier, signal data, and/or location information about traffic signal 222, and perhaps other information, such as timing information or information about related traffic signals, such as traffic signal 220, and/or information about other objects at or near intersection 216, such as bicycle 230, pedestrian 202, and/or motor vehicle(s) 210, 212, and/or 216.

People can provide reports to relaying servers using software executing on computing devices. For example, in scenario 200, pedestrian 232 has a mobile device executing a software application that can provide reports to phase map 242 maintained by relaying server 240 and receive information from phase map 242. The received information can be conveyed as text, diagrams, images, video, and/or audible information.

Figure 2B:
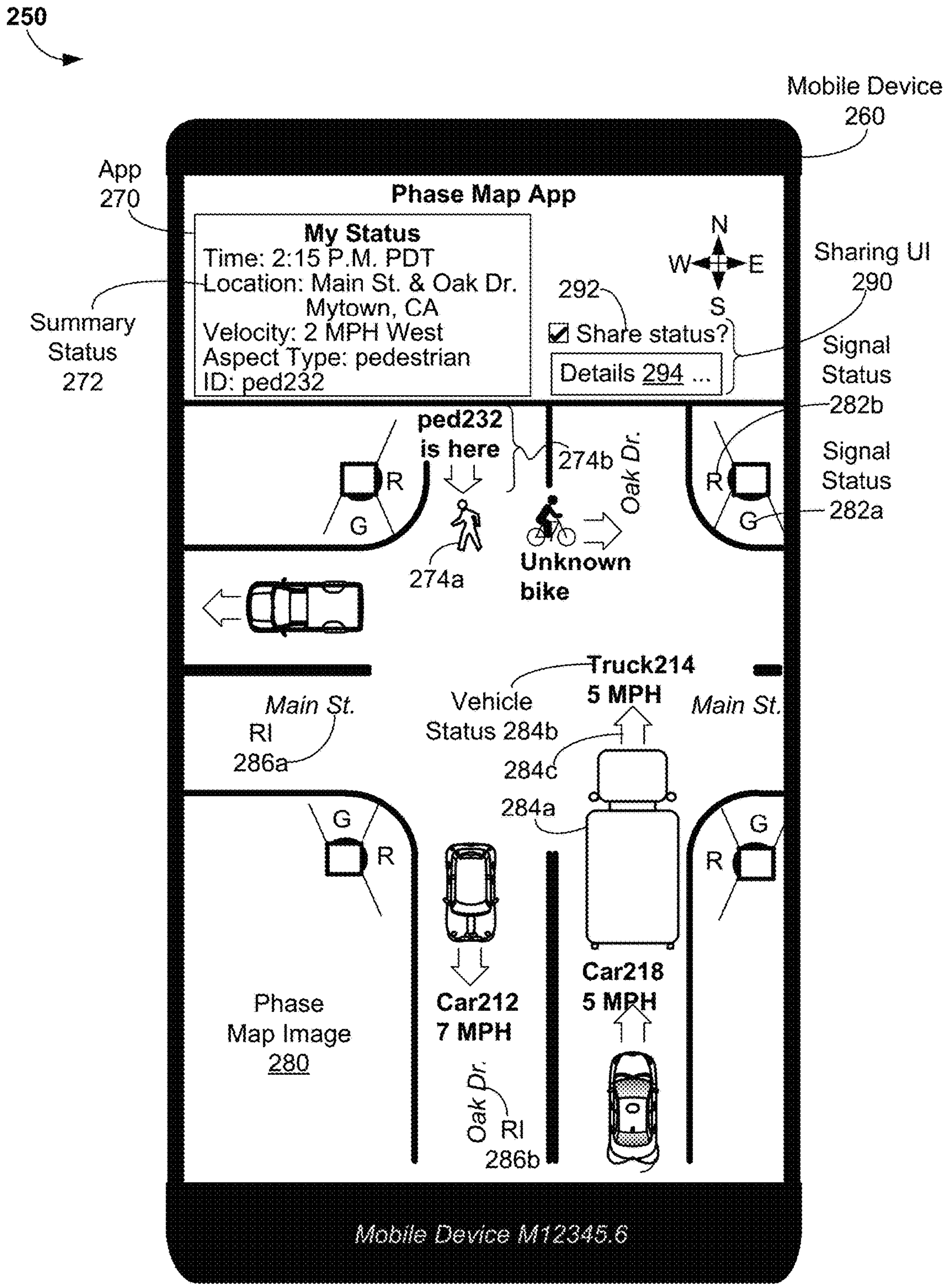
FIG. 2B shows an example scenario of a mobile device configured with a software application configured to display information from a phase map, in accordance with an example embodiment.

FIG. 2B shows an example scenario 250 of mobile device 260 configured with an application 270 to display information from and/or provide information to a phase map, in accordance with an example embodiment. For example, pedestrian 232 could use mobile device 260 to display status information and/or phase map data using application 270. Application 270 is configured to provide to and/or receive information from a phase map, such as phase map 242 and/or a relaying server, such as relaying server 240. Information received at application 270 can be conveyed as text, diagrams, images, video, and/or audible information using mobile device 260.

FIG. 2B shows application 270, entitled the "Phase Map App", displaying summary status 272, phase map image 280, and sharing user interface (UI) 290. Summary status 272 can provide information summarizing an aspect associated with application 270. FIG. 2B shows the summary information to include a time, a location of "Main St. and Oak Dr." in "Mytown, Calif.", a velocity of 2 miles/hour (MPH) heading west, an aspect type of "pedestrian" and an ID of "ped232". More, less, and/or different information can be provided as summary status 272.

Phase map image 280 includes status information for the aspect associated with application 270, as status 274*a* graphically depicting a location of "ped232" and showing the aspect as a pedestrian. Phase map image 280 also includes status information for other aspects at or near the intersection of Main St. and Oak Dr. For example, FIG. 2B shows four traffic signals, one at each corner of the intersection, with the signal at the northeast corner having signal status 282*a* of "G" for a green light for traffic on Oak Drive (north and southbound), and signal status 282*b* of "R" for a red light for traffic on Main St. (east and westbound).

As another example of aspect status shown by phase map image 280, a vehicle at location 284*a* on Oak Drive just beginning to cross Main Street with status information 284*b* and 284*c* indicating is "truck 214" moving at 5 MPH northbound. Road indicators (RI) 286*a*, 286*b* each indicate a name of a road shown in FIG. 2B; road indicator 286*a* naming "Main St." and road indicator 286*b* naming "Oak Dr."

Application 270 can provide information about possible hazards to the aspect associated with the application. For example, suppose the "unknown bike" shown in FIG. 2B changed direction to head toward the location of "ped232", and that that change in direction was reported to a phase map, such as phase map 242, providing data to application 270. Then, the phase map and/or application 270 can determine that "unknown bike" has changed direction to be headed toward ped232 and generate an alert about the possible hazard to ped232. Application 270 can then process the alert and display text such as "Bicycle approaching from behind", display a image and/or video of the approaching "unknown bike", display/update summary status 272 and/or phase map image 280 with graphical, textual, audio, and/or other information about positions of ped232 and/or "unknown bike" and/or to provide an alert about the possible hazard; e.g., "Alert—Unknown Bike Approaching from Behind!!" Many other scenarios, applications, and uses of phase map information are possible as well.

FIG. 2B shows sharing UI 290 with share status checkbox 292 and details button 294. Share status checkbox 292 can be used to enable or disable sharing of status and/or other information, such as but not limited to, some or all of the information shown in summary status 272; e.g., time, location, velocity, aspect type, and/or aspect ID. The status and/or other information can be shared with a relaying server and/or phase map; e.g., relaying server 240 and/or phase map 242. For example, application 270 can be configured to generate report(s) such as shown herein to provide information to the relaying server and/or phase map. Details button 294 can, when selected, display a dialog (not shown in FIG. 2B) to select what information to share; e.g., permit sharing of an aspect type and velocity information and disable sharing of aspect ID information, and/or timing of sending and/or reception of information; e.g., setting time period(s) for periodic sending and/or reception of information with a phase map.

Figure 3A:
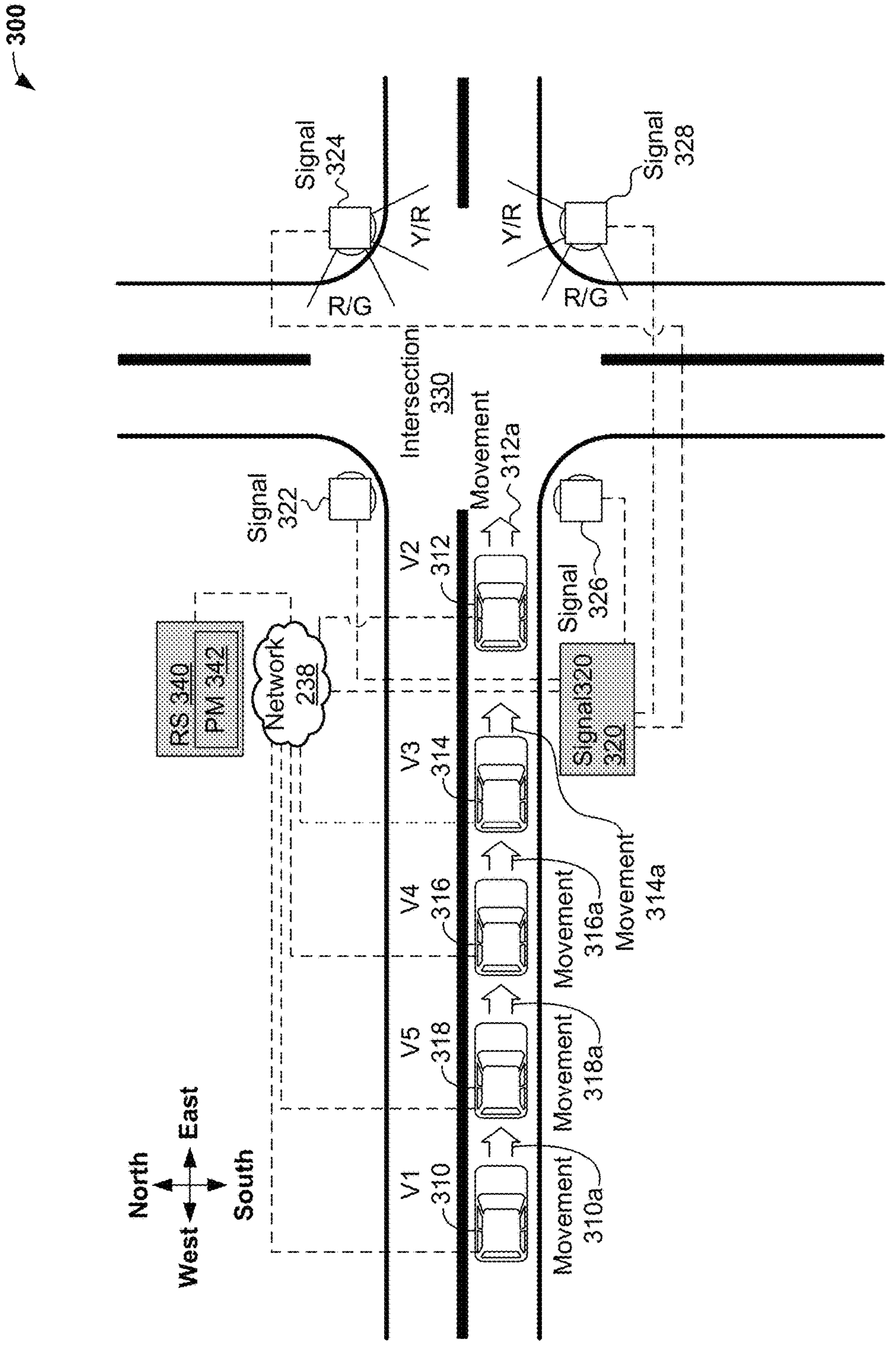
FIG. 3A shows an example site for a use case of phase maps, in accordance with an example embodiment.
Figure 3B:
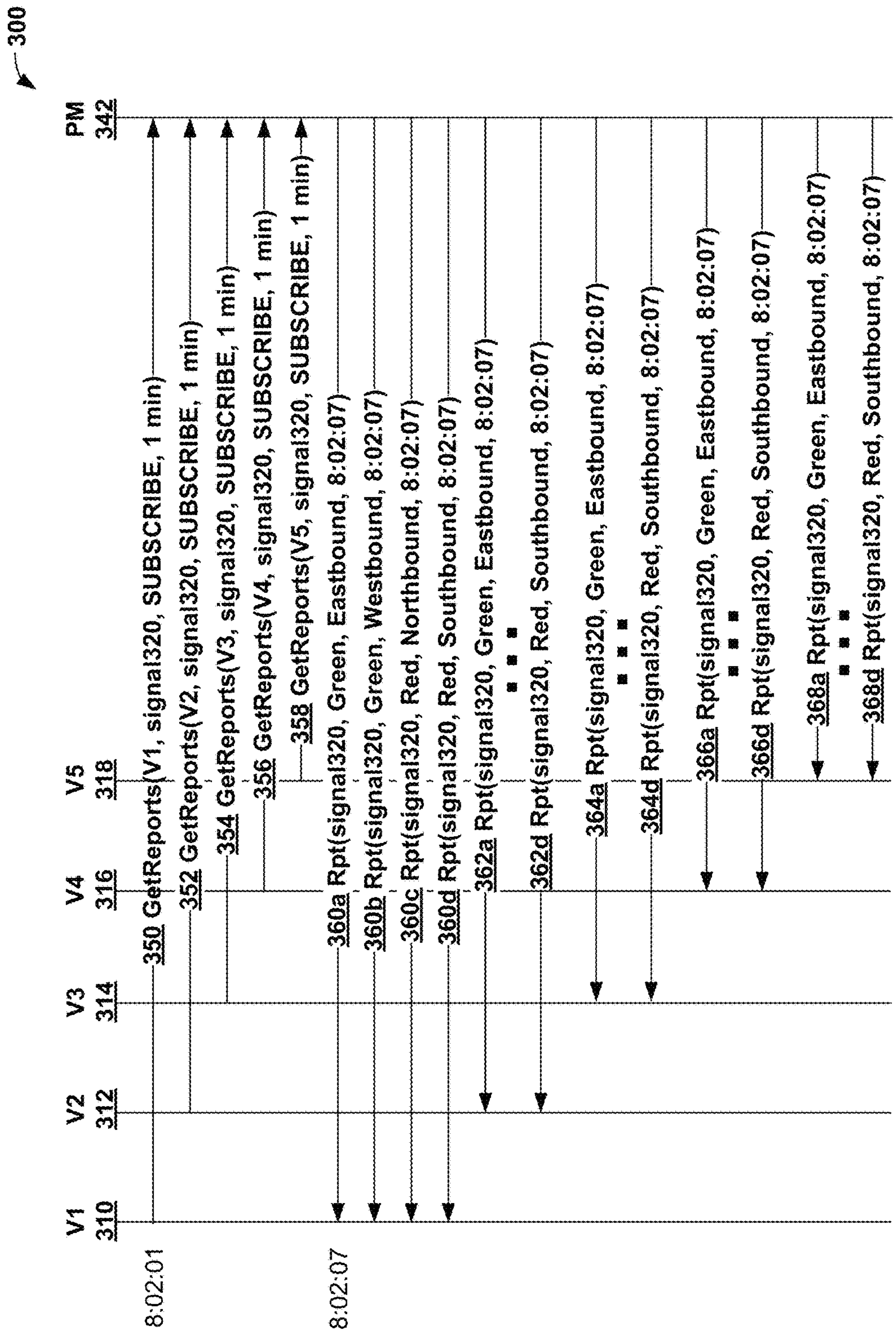
FIG. 3B shows example messaging during the use case shown in FIG. 3A, in accordance with an example embodiment.

FIG. 3A shows an example site for use case 300, and FIG. 3B shows example messaging during use case 300, in accordance with an example embodiment. In use case 300, Vehicle 1, shown in FIG. 3A as V1 310, is stopped at 8:02:00 PM going westbound toward intersection 330 with red traffic signals 324, 328. Traffic signals 324, 328, and the other traffic signals 322, 326 shown in FIG. 3A, are controlled by traffic signal controller 320 with ID="signal320". FIG. 3A also shows that four vehicles—V2 312, V3, 314, V4 316, and V4 318—are in front of V1 310.

All five vehicles—the four vehicles in front of Vehicle 1 and Vehicle 1 itself—can communicate with relaying server 340 to get information about the traffic signals at the intersection from phase map 342. For example, vehicle V1 310 and the four vehicles V2 312, V3 314, V4 316, and V5 318 in front of V1 310 can each send a GetReports query at 8:02:01 PM to relaying server 340 to learn about traffic signals controlled by traffic signal controller 320, such as the example query for Vehicle 1 shown in Table 1 below:

TABLE 1

```
GetReports(dest=Vehicle1,
  asp1=signal320,
  reporting = SUBSCRIBE, reporting_duration = 1 min)
```

The example query for V1 310 is shown graphically as message 350 of FIG. 3B, and the example queries for V2 312, V3 314, V4 316, and V5 318 are shown graphically in FIG. 3B as respective messages 352, 354, 356, and 358.

During use case 300, the red light changes to green at 8:02:07 PM. FIG. 3A shows this transition with "R/G", abbreviating "Red/Green Transition", shone by westward facing lights of signals 324 and 328. The corresponding transition from a yellow to a red signal in the northbound and southbound directions is shown as "Y/R" in FIG. 3A, shone by a northward facing light of signal 328, and a southward facing light of signal 324.

Traffic signal controller 320, which controls all four signals at the intersection, can send reports, such as those shown in Table 2 below to relaying server 340 and phase map 342.

TABLE 2

```
ASPECT = SIGNAL
ASPECTID = signal320
ME? = YES
LOCATION = Congress Pkwy at Michigan Ave. Chicago
STATUS = Green
SPEED = 0 MPH
DIR = Eastbound
TIME = 8:02:07 PM
ASPECT = SIGNAL
ASPECTID = signal320
ME? = YES
LOCATION = Congress Pkwy at Michigan Ave. Chicago
STATUS = Green
SPEED = 0 MPH
DIR = Westbound
TIME = 8:02:07 PM
ASPECT = SIGNAL
ASPECTID = signal320
ME? = YES
LOCATION = Michigan Ave. at Congress Pkwy Chicago
STATUS = Red
SPEED = 0 MPH
DIR = Northbound
TIME = 8:02:07 PM
ASPECT = SIGNAL
ASPECTID = signal320
ME? = YES
LOCATION = Michigan Ave. at Congress Pkwy Chicago
STATUS = Red
SPEED = 0 MPH
DIR = Southbound
TIME = 8:02:07 PM
```

Relaying server 340 and phase map 342 can send these reports to each of vehicles V1 310, V2 312, V3 314, V4 316, and V5 318 in response to the respective GetReports queries discussed above. These reports are shown graphically on FIG. 3B as reports 360*a-d* for V1 310, 362*a-d* for V2 312, 364*a-d* for V3 314, 366*a-d* for V4 316, and 368*a-d* for V5 318. Some of these reports are replaced by ellipses in FIG. 3B for reasons of space.

Each report from an aspect can be associated with a time, such as the time the report is sent, and a location. Each report can be subject to "aging out" due to time and/or location constraints that invalidate the report. Once a report has been aged out, the report can be discarded, not reported, and/or stored. Aged out reports that are stored can be used to determine trends, such as traffic flows, aspect counts on a daily, weekly, monthly or other basis, traffic cycles, and/or other trends related to roads, road features, and/or aspects.

Aging out can happen directly or indirectly. As an example of direct aging out, a first report can be received that indicates a pedestrian P is at an intersection of $1^{st}$ and Main Streets and is headed toward $2^{nd}$ St. Then, a later report can indicate that P is on Main St. halfway between $1^{st}$ and $2^{nd}$ Streets. As the pedestrian has moved past the intersection of $1^{st}$ and Main Streets, the first report about pedestrian P can be aged out.

As another example, suppose P is halfway between $1^{st}$ and $2^{nd}$ Streets at 10:00 PM and sends a report at that time and location. Then, a threshold age; e.g., 30 seconds, 60 seconds, etc., can be used to determine if the data in the 10:00 PM report is "stale" or out of date. If the threshold age is 60 seconds, then the report sent at 10:00 PM will be stale at 10:01 PM. Stale reports can then be aged out.

As an example of indirect aging out, suppose first reports indicate a vehicle V is reported stopped on Main St. near the intersection of 1st and Main Streets and that a traffic signal on Main St. is red. Later, a second report(s) indicate that the traffic signal on Main St. is green and V is moving on Main St. at 15 miles/hour. As V has moved to some yet unknown location, the phase map and/or relaying server can infer that V is no longer near the intersection of 1st and Main Streets, and indirectly age out the first reports about vehicle V. Many other examples of aging out, including direct and/or indirect aging out, are possible as well.

Subsequently, all five vehicles can receive the above reports from phase map 342 and/or relaying server 340. Based on the information in these reports, all five vehicles can begin moving forward, as shown in FIG. 3A as movements 310*a* for V1 310, 312*a* for V2 312, 314*a* for V3 314, 316*a* for V4 316, and 318*a* for V5 318, due to shared knowledge of the intersection phase map.

In some scenarios, PredictSignal queries can be used to obtain information about traffic cycles. A traffic cycle is one complete sequence of lights for a traffic signal. In some embodiments, a traffic cycle can begin with the traffic signal transitioning to a green light signal, maintaining the green light signal for a green-signal period of time, then transitioning to a yellow light signal, maintaining the yellow signal for a yellow-signal period of time, transitioning to a red light signal, and maintaining the red light signal for a red-signal period of time. A traffic cycle can end with the transition from a red light to a green light, which also begins a new traffic cycle.

A traffic-cycle time is the amount of time taken to complete a traffic cycle. For example, let the green-signal period for a traffic signal TS be 30 seconds, let the yellow-signal period for traffic signal TS be 10 seconds, and let the red-signal period for traffic signal TS be 40 seconds. Then, the traffic-cycle time for traffic signal time would be 30+10+40=80 seconds.

The PredictSignal query can be used to provide traffic cycle information for one or more signals, e.g., signal 322, 324, 326, and/or 328, and/or for signals controlled by one or more signal controllers, e.g., signal controller 320, for a period of time. For example, V1 320 can use the example PredictSignal query shown in Table 3 below to query signal controller 320 about traffic cycles that start on or before 8:02:00 PM (20:02:00 if expressed in 24-hour time) and end on or after 8:02:55 PM, at the intersection shown in FIG. 3A:

TABLE 3

```
PredictSignal(dest=Vehicle1,
  signal1=light320,
  starttime1 = 20:02:00, endtime1 = 20:02:55,
  reporting = DIGEST )
```

In response, phase map 342 can generate reports that predict complete traffic cycles for signals controlled by traffic signal controller 340 that begin at or before the start time; e.g., 8:02:00 PM and end at/after the end time; e.g., 8:02:55 PM. Once generated, phase map 342 can provide the reports to relaying server 340 to send to V1 310. Example reports are shown in Table 4:

TABLE 4

```
ASPECT = SIGNAL
ASPECTID = signal320
ME? = Yes
LOCATION = Congress Pkwy at Michigan Ave. Chicago
STATUSES = Green, Yellow, Red
CYCLE = 8:00:47 PM CDT, 8:01:17 PM CDT, 8:01:27 PM CDT
CYCLE = 8:02:07 PM CDT, 8:02:37 PM CDT, 8:02:47 PM CDT
SPEED = 0 MPH
DIR = Eastbound, Westbound
TIME = 8:02:01 PM CDT
ASPECT = SIGNAL
ASPECTID = signal320
ME? = Yes
LOCATION = Michigan Ave. at Congress Pkwy., Chicago
STATUSES = Green, Yellow, Red
CYCLE = 8:01:27 PM CDT, 8:01:57 PM CDT, 8:02:07 PM CDT
CYCLE = 8:02:47 PM CDT, 8:03:27 PM CDT, 8:03:37 PM CDT
SPEED = 0 MPH
DIR = Northbound, Southbound
TIME = 8:02:01 PM CDT
```

The example reports of Table 4 above includes a report line with STATUSES=Green, Yellow, Red to indicate times when the signals controlled by signal controller signal320 will be green, yellow, and red, respectively. The first example report uses two CYCLE report lines to indicate two cycles occur during the period of time between 8:02:00 PM and 8:02:55 PM for eastbound and westbound signals controlled by signal controller signal320. The first CYCLE report line in the first report, with times 8:01:27 PM CDT, 8:01:57 PM CDT, 8:02:07 PM CDT indicates the eastbound and westbound signals have a first traffic cycle that starts at 8:01:27 PM Central Daylight Time (CDT) with a transition to a green light, continues with transitions at 8:01:57 PM CDT to a yellow light and 8:02:07 PM CDT to a red light. The example report indicates that the first traffic cycle begins at 8:01:27 PM CDT, which is before the 8:02:00 PM beginning of the period of time.

According to the first example report in Table 4, the first traffic cycle for the eastbound and westbound traffic signals ends just before a green light transition at 8:02:47 PM. This green light transition begins a second traffic cycle of the eastbound and westbound signals. The second CYCLE report line in the first example report, with times 8:02:47 PM CDT, 8:03:27 PM CDT, 8:03:37 PM CDT indicate that the second traffic cycle starts at 8:02:47 PM CDT with a transition to a green light and continues with transitions at 8:03:27 PM CDT to a yellow light and 8:03:37 PM CDT to a red light. The second traffic cycle is displayed as the second traffic cycle starts at 8:02:47 PM, which is before the 8:02:55 PM end of the period of time. The second report in Table 4 shows similar information for the northbound and southbound signals controlled by signal controller 320.

Figure 3C:
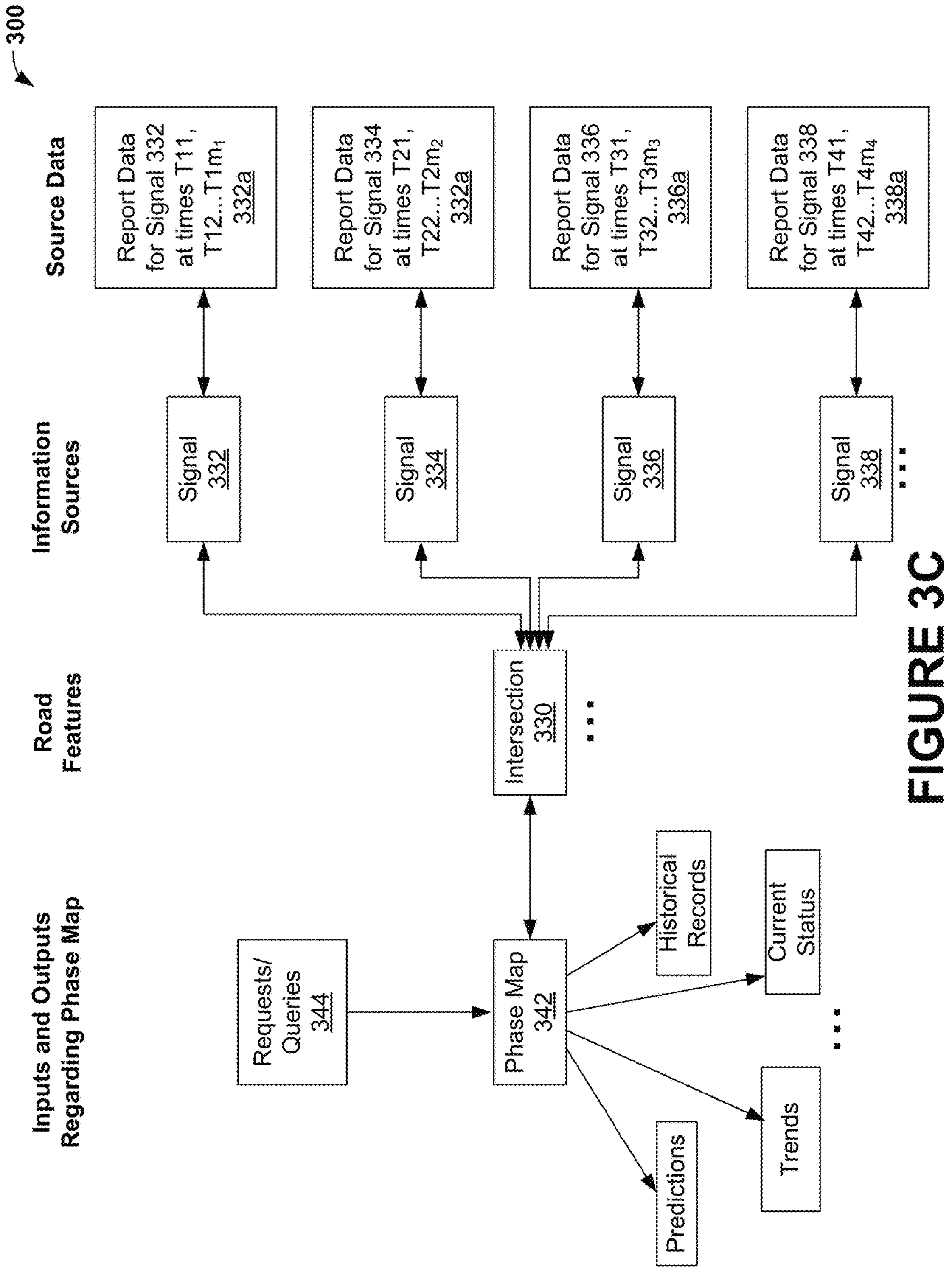
FIG. 3C shows an example phase map for the use case shown in FIG. 3A, in accordance with an example embodiment.

FIG. 3C shows example phase map 342 for use case 300 shown in FIG. 3A, in accordance with an example embodiment. Phase map 342 is related to road features, such as intersection 330, information sources, such as signals 332, 334, 336, and 338, and source data 332*a*, 334*a*, 336*a*, and 338*a* for respective information sources 332, 334, 336, and 338. Phase map 342 can organize source data for each information source based on time, so that phase map 342 can access data for an information source for a specified time and/or range of times.

Phase maps can be constructed. For example, to construct a phase map, such as phase map 342: data for phase map 342 can be initialized, one or more road features can be associated with the phase map, one or more information sources can be associated, directly or indirectly, with the phase map, and source data for the information sources can be made available to the phase map. Initialized phase map 342, as shown in FIG. 3C, is associated with one road feature, intersection 330, and indirectly associated with four information sources, signals 332, 334, 336, and 338 directly associated with intersection 330 and can access source data associated with signals 332, 334, 336, and 338 to generate outputs regarding intersection 330 and/or signals 332, 334, 336, and 338. In some embodiments, phase map 342 can be constructed by server 340 and be resident in memory of server 340.

Phase map 342 can use source data for a range of times to determine trends within the data. For example, let source data for signal 332 show that signal 332 had Red/Green Transitions at 8:01:00 AM, 8:02:00 AM, 8:03:00 AM, 8:04:00 AM, and 8:05:00 AM on Monday Jan. 21, 2013, and Red/Green Transitions at 8:01:02 AM and 8:02:02 AM on Tuesday, Jan. 22, 2013. By analyzing this data, phase map 342 can determine that (a) Red/Green Transitions take place on one-minute intervals on both Jan. 21 and Jan. 22, 2013 and (b) the transitions are starting at 2 seconds after the minute mark on Jan. 22, 2013. Then, in response to a query for trends in Red/Green Transitions of signal 332 between 8:03 and 8:08 AM on Jan. 22, 2013, phase map 342 can generate an output indicating a trend for Red/Green Transitions at 8:03:02 AM, 8:04:02 AM, 8:05:02 AM, 8:06:02 AM, and 8:07:02 AM on Jan. 22, 2013.

Predictions can indicate some amount of uncertainty; for example, based on the same data, in response to a query for trends in Red/Green Transitions of signal 332 between 8:03 and 8:08 AM on Wednesday Jan. 23, 2013, phase map 342 can generate an output indicating a trend for Red/Green Transitions at 8:03:01 AM+/−1 second, 8:04:01 AM+/−1 second, 8:05:01 AM+/−1 second, 8:06:01 AM+/−1 second, and 8:03:01 AM+/−1 second, on Wednesday Jan. 23, 2013.

To continue this example, suppose the source data for signal 332 also show

Green/Yellow Transitions at 8:01:25 AM, 8:02:25 AM, 8:03:25 AM, 8:04:25 AM, and 8:05:25 AM on Monday Jan. 21, 2013, and at 8:01:27 AM and 8:02:27 AM on Tuesday Jan. 22, 2013, and Yellow/Red Transitions at 8:01:30 AM, 8:02:30 AM, 8:03:30 AM, 8:04:30 AM, and 8:05:30 AM on Monday Jan. 21, 2013, and at 8:01:32 AM and 8:02:32 AM on Tuesday, Jan. 22, 2013.

Then, based on this data, phase map 342 can predict that, on Wednesday, Jan. 23, 2013, signal 332 will be: green between 8:02:01 and 8:02:26 with an uncertainty of 1 second, yellow between 8:02:26 and 8:02:31 with an uncertainty of 1 second, and red between 8:02:31 and 8:03:01 with an uncertainty of 1 second.

Phase map 342 can use source data answer queries regarding the current status of a road feature; e.g., what color signal is signal 332 displaying to west-bound traffic? How long has that signal been displayed? In some scenarios, the source data may change during query processing; e.g., suppose at 3:00:00 PM a query is received to regarding the color that signal 332 is currently displaying to west-bound traffic and that immediately after receiving that query, a report from signal 332 is received indicating a red/green transition for west-bound traffic. Then, in response, phase map 342 can indicate the previous state of "red" as the current state at the time when the query is received, "green" as the current state at the time when the query is completely processed, and/or "red/green transition" to indicate the signal changed from red to green while the query was being processed.

Phase map 342 can also predict trends, such as a drift in the time of signal 332 of 2 seconds between two adjacent days. To continue this example, suppose signal 332 is configured to provide a count of cars that pass by the signal, then phase map 342 can predict which days of the week have the most or least traffic at intersection 330, amounts of traffic at specific times, traffic trends, historical traffic records, and perhaps other types of information.

By examining data from multiple information sources, phase map 342 can determine relationships between information sources. For example, suppose that each signal at intersection 330 can provide information about each lamp of each signal; e.g., signal 322 has a east lamp best seen by west-bound traffic and a south lamp best seen by north-bound traffic, and signal 326 has a east lamp best seen by west-bound traffic and a north lamp best seen by southbound traffic. Also, suppose that source data for both signals 332 and 336 include data on Red/Green (R/G), Green/Yellow (G/Y), and Yellow/Red (Y/R) transitions for each lamp, and that an example excerpt of source data from signals 332 and 336 is summarized in Table 5 below.

TABLE 5

| Time | Signal 322 South Lamp | Signal 322 West Lamp | Signal 326 North Lamp | Signal 326 West Lamp |
|---|---|---|---|---|
| 10:03:00 AM | R/G Transition | Y/R Transition | R/G Transition | Y/R Transition |
| 10:03:42 AM | G/Y Transition | — | G/Y Transition | — |
| 10:03:48 AM | Y/R Transition | R/G Transition | Y/R Transition | R/G Transition |
| 10:04:25 AM | — | G/Y Transition | — | G/Y Transition |
| 10:04:31 AM | R/G Transition | Y/R Transition | R/G Transition | Y/R Transition |

Based on the data in Table 5, phase map 342 can determine at least the following relationships between lamps in signals 322 and 326: (a) the south lamp of signal 322 and the north lamp of signal 326 are synchronized; that is, show the same color at the same time, (b) the west lamp of signal 322 is synchronized with the west lamp of signal 326, (c) the south lamp of signal 322 is not synchronized with either the west lamp of signal 322 or the west lamp of signal 326, and (d) the south lamp of signal 326 is not synchronized with either the west lamp of signal 322 or the west lamp of signal 326.

If a query requests historical data; e.g., a query for a color of the north lamp of signal 322 yesterday at 4 PM, then phase map 342 can access the source data for signal 322 to determine the requested color. Similarly, phase map 342 can access source data to determine historical trends, requests covering ranges of times, and other queries for historical information. In some cases, data may be unavailable; e.g., a query for 10-year old information about a 5-year old road feature or a query regarding a vehicle that has passed by a road feature, and phase map 342 can respond with an appropriate response; e.g., an error message or similar information indicating that the data unavailable to answer the input query.

Figure 4A:
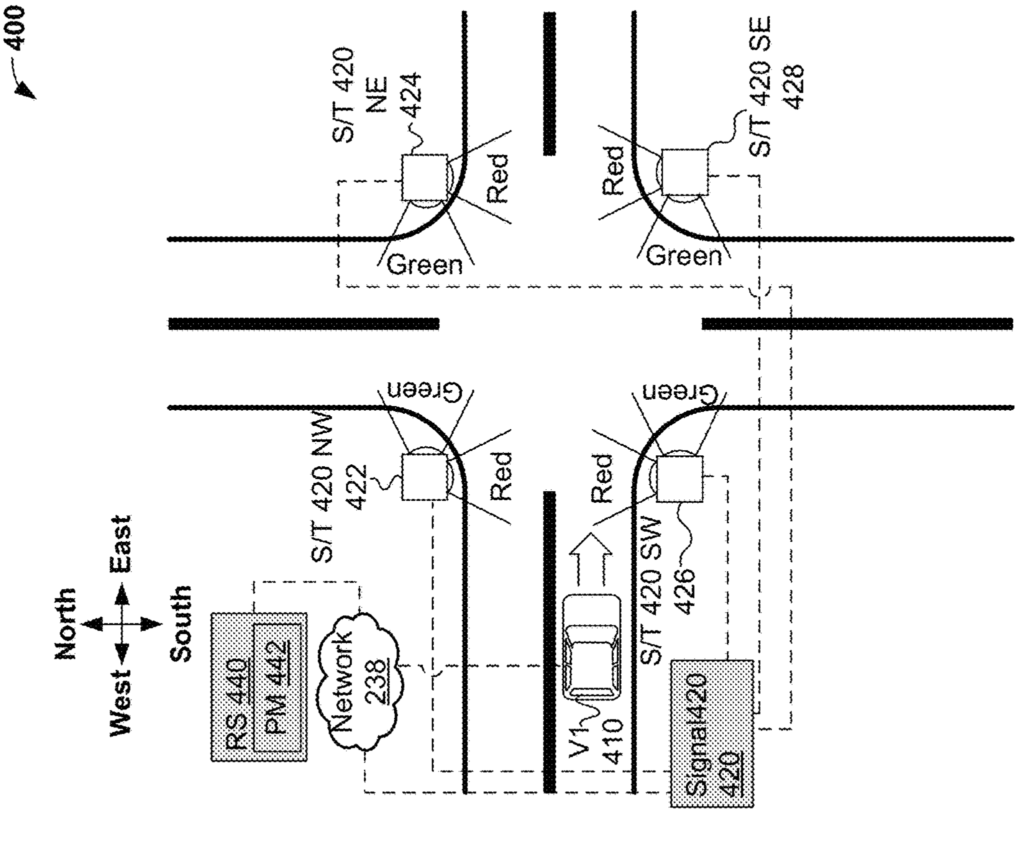
FIG. 4A shows an example site for another use case of phase maps, in accordance with an example embodiment.
Figure 4B:
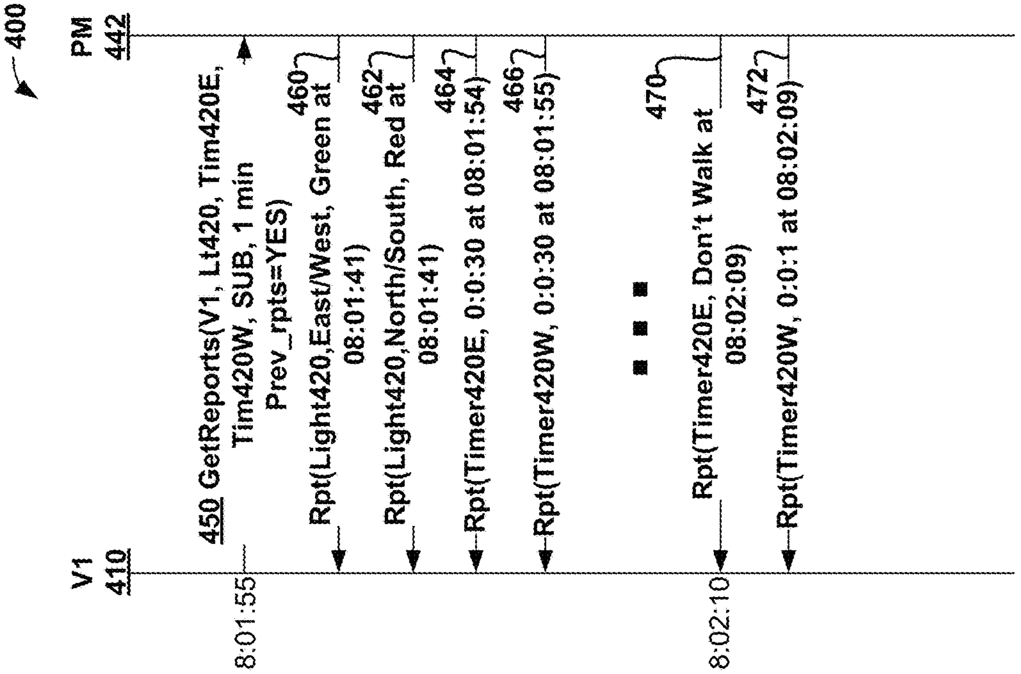
FIG. 4B shows example messaging during the use case shown in FIG. 4A, in accordance with an example embodiment.

FIG. 4A shows an example site for use case 400, and FIG. 4B shows example messaging during use case 400, in accordance with an example embodiment. In use case 400, Vehicle 1, shown in FIG. 4A as V1 410, is moving east bound approaching an intersection with green signals in the eastbound/westbound directions and red signals in the northbound and southbound direction. The four signals 422, 424, 426, and 428 at the intersection are connected to and controlled by a traffic signal controller 420 with an ID="signal 420."

Signal 422, shown as "S/T 420 NW" on the northwest corner of the intersection in FIG. 4A, is associated with two signal timers that track and display timing information about traffic signals: one timer for north bound traffic, and one timer for west bound traffic. Signal 424, shown as "S/T 420 NE" on the northeast corner of the intersection of FIG. 4A is associated with two signal timers as well: one timer for north bound traffic, and one timer for east bound traffic. Additionally, signals 426 and 428, respectively shown as "S/T 420 SW" and "S/T 420 SE" on the southwest and southeast corners of the intersection of FIG. 4A are each associated with two signal timers. Both signals 426 and 428 are associated with a timer for south bound traffic. Signal 426 is associated with a timer for west bound traffic and signal 428 is associated with a timer for east bound traffic.

Use case 400 begins at 8:01:55 AM CDT where V1 410 sends a GetReports query, shown in FIG. 4B as query 450, to phase map 442 of reporting server 440 to request reports about signal 420 and associated timers at the intersection prior to approaching the intersection. An example of query 450 is shown in Table 6 below:

TABLE 6

```
GetReports(dest=Vehicle1,
  asp1=signal420, asp2=timer420east, asp3=timer420west,
  asp_reporting = SUBSCRIBE,
  reporting_duration = 1 min,
  prev_report = YES)
```

In some embodiments, the SUBSCRIBE option to GetReports query provides all reports about the specified aspect (s) of interest that are received by relaying server(s) and/or phase map(s) during the specified reporting_duration, which in the example shown in Table 6 above is set to one minute. When the prev_report option to GetReports query is set to YES, such as shown above in Table 6, the relaying server and/or phase map can provide the most recently received report(s) for the specified aspect(s) prior to the query.

The GetReports query is shown graphically in FIG. 4B as message 450 sent from V1 410 to phase map (PM) 442. In FIG. 4B, example times are shown to the left of the vertical line representing V1 410.

In response, Vehicle 1 receives the reports shown in Table 7, perhaps among others. The first four reports in Table 7, shown as reports 460, 462, 464 are due to the prev_report=YES setting:

TABLE 7

```
ASPECT = SIGNAL
ASPECTID = signal420
ME? = YES
LOCATION = Congress Pkwy. at State St. Chicago
STATUS = Green
SPEED = 0 MPH
DIR = Eastbound, Westbound
TIME = 8:01:41 AM
ASPECT = SIGNAL
ASPECTID = signal420
ME? = YES
LOCATION = Congress Pkwy. at State St. Chicago
STATUS = Red
SPEED = 0 MPH
DIR = Northbound, Southbound
TIME = 8:01:41 AM
ASPECT = SIGNAL TIMER
```

TABLE 7-continued

```
ASPECTID = timer420east
ME? = YES
LOCATION = Congress Pkwy. at State St. Chicago
STATUS = Current Timer = 0:0:30
SPEED = 0 MPH
DIR = Eastbound
TIME = 8:01:54 AM Central
ASPECT = SIGNAL TIMER
ASPECTID = timer420west
ME? = YES
LOCATION = Congress Pkwy at State St. Chicago
STATUS = Current Timer = 0:0:30
SPEED = 0 MPH
DIR = Westbound
TIME = 8:01:55 AM Central
. . .
ASPECT = SIGNAL TIMER
ASPECTID = timer420east
ME? = YES
LOCATION = Congress Pkwy. at State St. Chicago
STATUS = Current Timer = Don't Walk
SPEED = 0 MPH
DIR = Eastbound
TIME = 8:02:09 AM Central
ASPECT = SIGNAL TIMER
ASPECTID = timer420west
ME? = YES
LOCATION = Congress Pkwy at State St. Chicago
STATUS = Current Timer = 0:0:1
SPEED = 0 MPH
DIR = Westbound
TIME = 8:02:09 AM Central
```

The last two reports in Table 7 are received by V1 410 at 8:02:10 AM Central time. FIG. 4B shows the reports received at 8:02:10 AM as reports 470 and 472.

FIG. 4A shows V1 410 at the position reached at 8:02:10 AM during use case 400. Based on the information of the reports shown in Table 7, V1 410 knows the east/west traffic signal is highly likely to turn yellow within a few seconds at most. Then, if driven autonomously V1 410 can automatically slow down as it approaches the intersection. If V1 410 is not driving autonomously, V1 410 can generate a "green light will soon change", "yellow/red light anticipated", or similar alert so that a driver can slow down in anticipation of the yellow/red light.

In other use cases, V1 410 can query phase map 442 to get information about predicted traffic cycles. For example, at 8:01:55 AM, V1 410 can send the example PredictSignal query shown in Table 8 to obtain information about signal "signal420", perhaps instead of or along with the GetReports query previously shown in Table 6:

TABLE 8

```
PredictSignal(dest=Vehicle1,
  signal1=signal420,
  starttime1 = NOW, endtime1 = NOW + 1 min,
  reporting = DIGEST )
```

The PredictSignal query can be used to provide traffic cycle information for one or more signals, such as the specified signal1=signal420 shown in the example query, for a period of time. The example query uses the starttime1=NOW to specify the start of the period of time as the current time "NOW" and the endtime1=NOW+1 min parameter to specify the end of the period of time as one minute in the future. That is, the period of time in this example is the interval from 8:01:55 AM to 8:02:55 AM. The reporting=DIGEST parameter to the example query indicates the results of the query are to be provided as a digest, or summary form.

In response, V1 410 can receive the example digest report shown in Table 9 below to report prediction of the complete traffic cycles that begin at or before the start of the period of time and end at or after the end of the period of time:

TABLE 9

| |
|---|
| ASPECT = SIGNAL |
| ASPECTID = signal420 |
| ME? = No |
| LOCATION = Congress Pkwy. at State St. Chicago |
| STATUSES = Green, Yellow, Red |
| CYCLE = 8:01:40 AM CDT, 8:02:10 AM CDT, 8:02:16 AM CDT |
| CYCLE = 8:02:52 AM CDT, 8:03:22 AM CDT, 8:03:28 AM CDT |
| SPEED = 0 MPH |
| DIR = Eastbound |
| TIME = 8:01:56 AM |

The example report to the PredictSignal query shown above includes STATUSES=Green, Yellow, Red to indicate times when the eastbound signal of signal 420 will be green, yellow, and red, respectively. The example report indicates the eastbound signal has a first traffic cycle that starts at 8:01:40 AM CDT with a transition to a green light, continues with transitions at 8:02:10 AM CDT to a yellow light and 8:02:16 AM CDT to a red light. The first traffic cycle begins at 8:01:40 AM CDT, which is before the 8:01:55 AM CDT beginning of the period of time.

According to the example report in Table 9, the first traffic cycle ends just before a green light transition at 8:02:52 that begins a second traffic cycle for the eastbound signal. The second CYCLE report line in the example report indicates that the second traffic cycle starts at 8:02:52 AM CDT with a transition to a green light and continues with transitions at 8:03:22 AM CDT to a yellow light and 8:03:28 AM CDT to a red light. The second traffic cycle is displayed as the second traffic cycle starts at 8:02:52 AM, which is before the 8:02:55 AM end of the period of time.

Figure 5A:
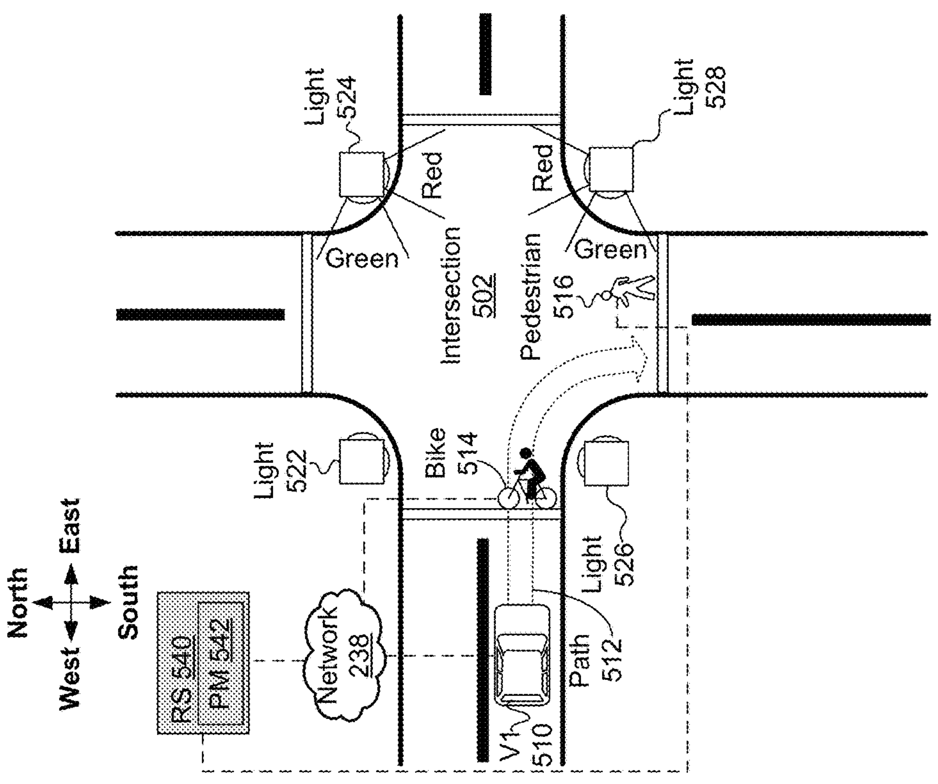
FIG. 5A shows an example site for yet another use case of phase maps, in accordance with an example embodiment.
Figure 5B:
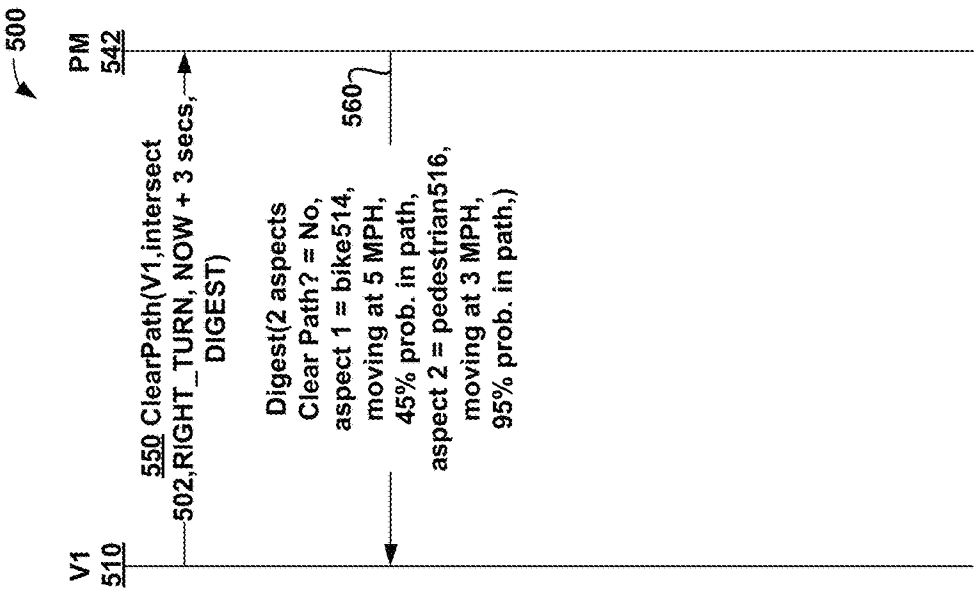
FIG. 5B shows example messaging during the use case shown in FIG. 5A, in accordance with an example embodiment.

FIG. 5A shows an example site for use case 500, and FIG. 5B shows example messaging during use case 500, in accordance with an example embodiment. In use case 500, Vehicle 1, shown in FIG. 5A as V1 510, is moving east bound approaching intersection 502 with ID="intersect502" with the intention to make a right turn at intersection 502 in a few seconds, such as indicated by path 512 of FIG. 5A.

To learn more about actual and predicted conditions at intersection 502, V1 510 can send an information request 550 to a relaying server 540 with phase map 542 maintaining information about intersection 502. An example of information request 550 is the ClearPath query shown in Table 10 below:

TABLE 10

```
ClearPath(dest=Vehicle1,
   asp=intersect502,
   path=RIGHT_TURN, pathtime = NOW + 3 secs,
   path_reporting = DIGEST)
```

In the example ClearPath query shown above, the path=RIGHT_TURN parameter can indicate a proposed or predicted path to be searched when traversing the aspect intersect502 specified using the asp=intersect502 parameter. In other examples, the value of the path parameter can specify other paths to be searched; e.g., path can be set to LEFT_TURN, STRAIGHT_AHEAD, BACK_LEFT, BACK_RIGHT or BACK_UP. Other and/or additional values of the path parameter are possible as well. The pathtime=NOW+3 secs parameter indicates that V1 510 predicts that it will make the right turn at time NOW+3; that is, three seconds in the future.

Relaying server 540 can receive information request 550 and query phase map 542 to estimate the paths of aspects in and near the intersection and project where those aspects will be when Vehicle 1 wants to make the right turn. Based on a response to the query, relaying server 540 and/or phase map 542 can inform V1 510 about any aspects known by the phase map in the path. In use case 500, bike 514, with an ID="bike514", and pedestrian 516, with an ID="pedestrian516", are connected to relaying server 540 and/or phase map 542, shown in FIG. 5A using dashed lines connected to network 538, which in turn is connected to relaying server 540.

FIG. 5A shows that bike 514 and pedestrian 516 may be in or near path 512 during the right turn proposed by vehicle V1 510. In this scenario, bike 514 and pedestrian 516 have provided information about their respective positions and velocities. In particular scenarios, bike 514 and pedestrian 516 can enable a software application and/or mobile device to share information about their respective positions and velocities, such as application 270 operating on mobile device 260 discussed above in the context of FIG. 2B above. In other scenarios, information about bike 514 and/or pedestrian 516 can be provided by other aspects, such as via reports sent by other vehicles and/or road features; e.g., pressure sensors or cameras for traffic signals.

In response, relaying server 540 and/or phase map 542 can send vehicle V1 510 a digest report responding to the ClearPath query, such as report 560 of FIG. 5B, which corresponds to the example report shown in Table 11 below:

TABLE 11

| |
|---|
| DIGEST COUNT = 2 |
| CLEAR PATH? = NO |
| ASPECT = PPV, PPV |
| ASPECTID = bike514, pedestrian516 |
| ME? = NO, NO |
| LOCATION = Michigan Ave., Chicago |
| STATUSES = Moving, Moving |
| PROB = 45%, 95% |
| SPEED = 5 MPH, 3 MPH |
| DIR = Westbound |
| TIME = 8:02:10 PM Local |

The above digest report can give Vehicle 1 a prediction that two aspects may be in path 512: (i) bike 514, which is a Person-Powered Vehicle (PPV), has a 45% probability of being in path 512 at time NOW+3 seconds and is moving at 5 MPH, and (ii) pedestrian 516, also a PPV, has a 95% probability of being in path 512 at time NOW+3 seconds and is moving at 3 MPH.

In response to learning about the bicyclist and pedestrian, Vehicle 1 can slow down, stop, (if autonomously driven) and/or alert the driver (if partially or completely-human driven) to let the bicyclist and pedestrian pass through the intersection before making a right hand turn.

As shown in FIG. 5A, in use case 500, V1 510 may have a clear line of sight to see bike 514, but may not have a clear line of sight to see pedestrian 516. Phase map 542 may be able to respond to queries; e.g., ClearPath queries, to enhance the safety of a vehicle, such as V1 510, by informing V1 510 about aspects potentially or actually in the vehicle's path. These aspects may include but not limited to, aspects that may not be in view of the vehicle yet have a high probability of being in the vehicle's path, such as pedestrian 516 of use case 500.

Figure 6B:
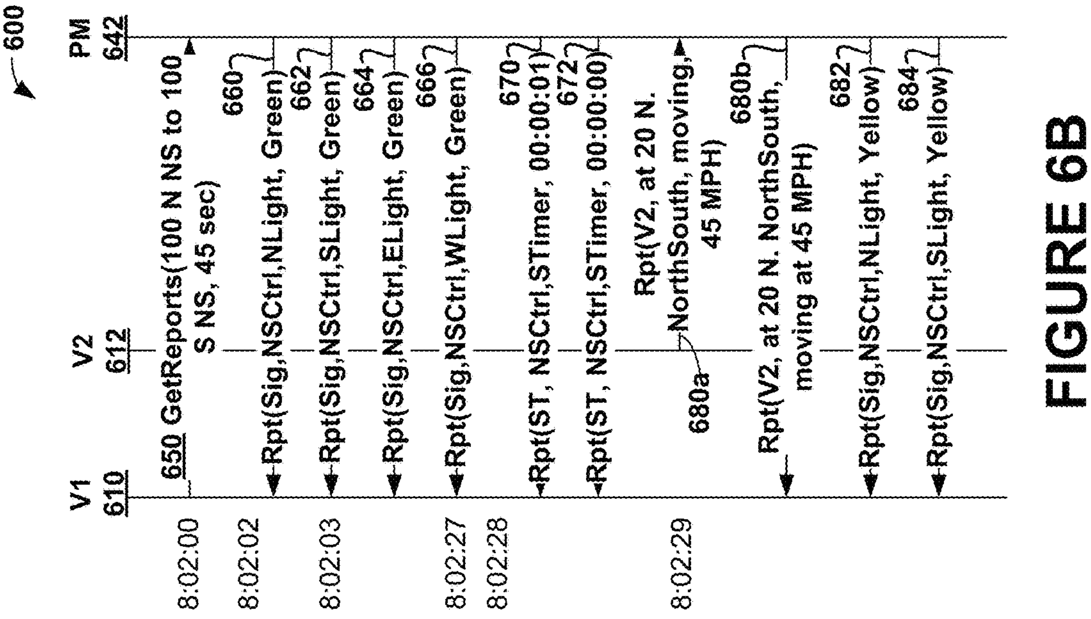
FIG. 6B shows example messaging during the use case shown in FIG. 6A, in accordance with an example embodiment.
Figure 6A:
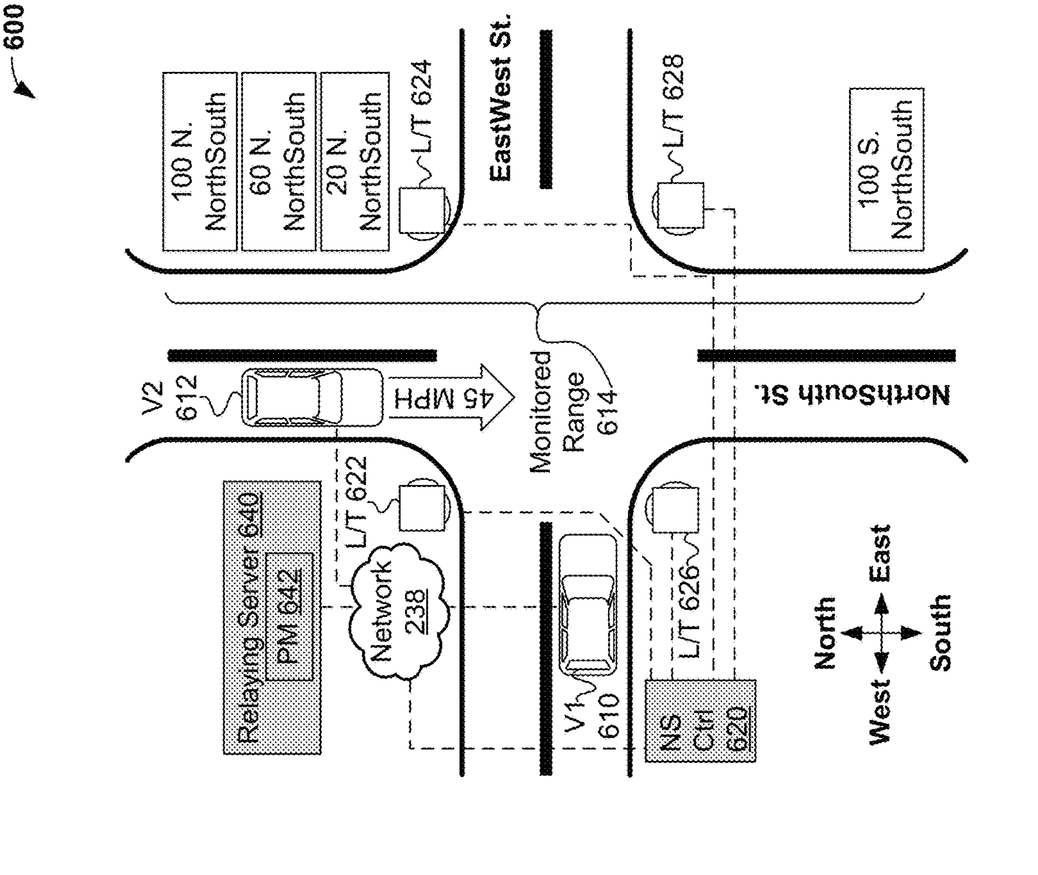
FIG. 6A shows an example site for still another use case of phase maps, in accordance with an example embodiment.

FIG. 6A shows an example site for use case 600, and FIG. 6B shows example messaging during use case 600, in accordance with an example embodiment.

In use case 600, Vehicle 1, shown in FIG. 6A as V1 610, is stopped as the first vehicle at a red light. Specifically, at 8:02:00 PM, V1 610 is at the intersection of EastWest and NorthSouth Streets waiting to travel east on EastWest Street. FIG. 6A shows the intersection of NorthSouth and EastWest, with vehicle V1 waiting on EastWest Street to cross the intersection. The intersection has four traffic signals, each of which acts as a combined traffic signal/crosswalk timer (S/T). FIG. 6A shows the four traffic signals as S/T 622, 624, 626, and 628 connected to, using dashed lines, and controlled by NorthSouth and EastWest signal controller (NS Ctrl) 620. FIG. 6A also shows that vehicles V1 610 and V2 612, NS Ctrl 620, and relaying server 640 with phase map (PM) 642 are all shown, using dashed lines, as connected to each other via network 638.

At 8:02:00, V1 610 sends the query shown in Table 12 to the relaying server to monitor a range 614 of NorthSouth Street near the intersection for the next 45 seconds:

TABLE 12

```
GetReports(dest= Vehicle1,
  seg1= {road= NorthSouth, start= 100 N. NorthSouth, end= 100
S. NorthSouth},
  reporting= SUBSCRIBE,
  reporting_duration= 45 sec)
```

V1 610 specified monitored range 614 using the seg1 parameter to specify a road segment, indicated in Table 12 above as: {road=NorthSouth, start=100 N. NorthSouth, end=100 S. NorthSouth}. In this example, EastWest St. is the baseline a.k.a. 0 North/0 South St. Then, 100 N. NorthSouth is one block north of EastWest St. and 100 S. NorthSouth is one block south of EastWest St. Thus, by monitoring the above-specified road segment, V1 610 has requested to learn about traffic-related events on NorthSouth St. within a block in either direction of the intersection of NorthSouth and EastWest. Use of the "reporting=SUBSCRIBE" parameter in the GetReports query enables V1 610 to receive all reports received by the reporting server, and an amount of time equal to 45 seconds for monitoring monitored range 614 is specified using the "reporting_duration=45 sec" in the GetReports query.

The GetReports query is shown graphically in FIG. 6B as message 650 sent from V1 610 to phase map (PM) 642. In FIG. 6B, example times are shown to the left of the vertical line representing V1 610.

During this 45 second interval, Vehicle1 gets the following reports from the relaying server shown in Table 13 below:

TABLE 13

```
ASPECT = SIGNAL
ASPECTID = NorthSouth_and_EastWest_signal_ctrl
ME? = YES
LOCATION = NorthSouth and EastWest
STATUS = Green
SPEED = 0 MPH
DIR = Northbound
TIME = 8:02:02 PM
ASPECT = SIGNAL
ASPECTID = NorthSouth_and_EastWest_signal_ctrl
ME? = YES
LOCATION = NorthSouth and EastWest
STATUS = Green
```

TABLE 13-continued

```
SPEED = 0 MPH
DIR = Southbound
TIME = 8:02:02 PM
ASPECT = SIGNAL
ASPECTID = NorthSouth_and_EastWest_signal_ctrl
ME? = YES
LOCATION = NorthSouth and EastWest
STATUS = Red
SPEED = 0 MPH
DIR = Eastbound
TIME = 8:02:03 PM
ASPECT = SIGNAL
ASPECTID = NorthSouth_and_EastWest_signal_ctrl
ME? = YES
LOCATION = NorthSouth and EastWest
STATUS = Red
SPEED = 0 MPH
DIR = Westbound
TIME = 8:02:03 PM
. . .
ASPECT = SIGNAL TIMER
ASPECTID = NorthSouth_and_EastWest_signal_ctrl
ME? = YES
LOCATION = NorthSouth and EastWest
STATUS = Current Timer = 00:00:01
SPEED = 0 MPH
DIR = Southbound
TIME = 8:02:27 PM
ASPECT = SIGNAL TIMER
ASPECTID = NorthSouth_and_EastWest_signal_ctrl
ME? = YES
LOCATION = NorthSouth and EastWest
STATUS = Current Timer = 00:00:00
SPEED = 0 MPH
DIR = Southbound
TIME = 8:02:28 PM
```

These reports are also shown in FIG. 6B as reports 660, 662, 664, 666, 670, and 672.

At 8:02:29 PM, the first report shown in Table 14 below is sent from V2 612 to phase map 642. Phase map 642 relays the first report and two additional reports, also shown in Table 14, to Vehicle 1:

TABLE 14

```
ASPECT = CAR
ASPECTID = Vehicle2
ME? = NO
LOCATION = 20 N. NorthSouth
STATUS = Moving
SPEED = 45 MPH
DIR = Southbound
TIME = 8:02:29 PM
ASPECT = SIGNAL
ASPECTID = NorthSouth_and_EastWest_signal_ctrl
ME? = YES
LOCATION = NorthSouth and EastWest
STATUS = Yellow
SPEED = 0 MPH
DIR = Northbound
TIME = 8:02:29 PM
ASPECT = SIGNAL
ASPECTID = NorthSouth_and_EastWest_signal_ctrl
ME? = YES
LOCATION = NorthSouth and EastWest
STATUS = Yellow
SPEED = 0 MPH
DIR = Southbound
TIME = 8:02:29 PM
```

These reports are shown in FIG. 6B as reports 680*a* (from V2 612 to phase map 642), 680*b* (from phase map 642 to V1 610), 682, and 684.

From reports 680*b*, 682, and 684, V1 610 learns that at 8:02:29 PM, both (a) V2 612 is just north of the intersection and appears to be moving at 45 MPH southbound toward the intersection, and (b) the green signals on NorthSouth St. controlling northbound and southbound traffic have just turned yellow. By knowing Vehicle 2 has shown no signs of slowing despite a traffic signal likely to turn red, Vehicle 1 can remain stopped longer than it might otherwise if there was no cross traffic, or perhaps creep very slowly toward the intersection to better view Vehicle 2 approaching from Vehicle 1's left (from the north).

Example Vehicle Systems

Figure 7:
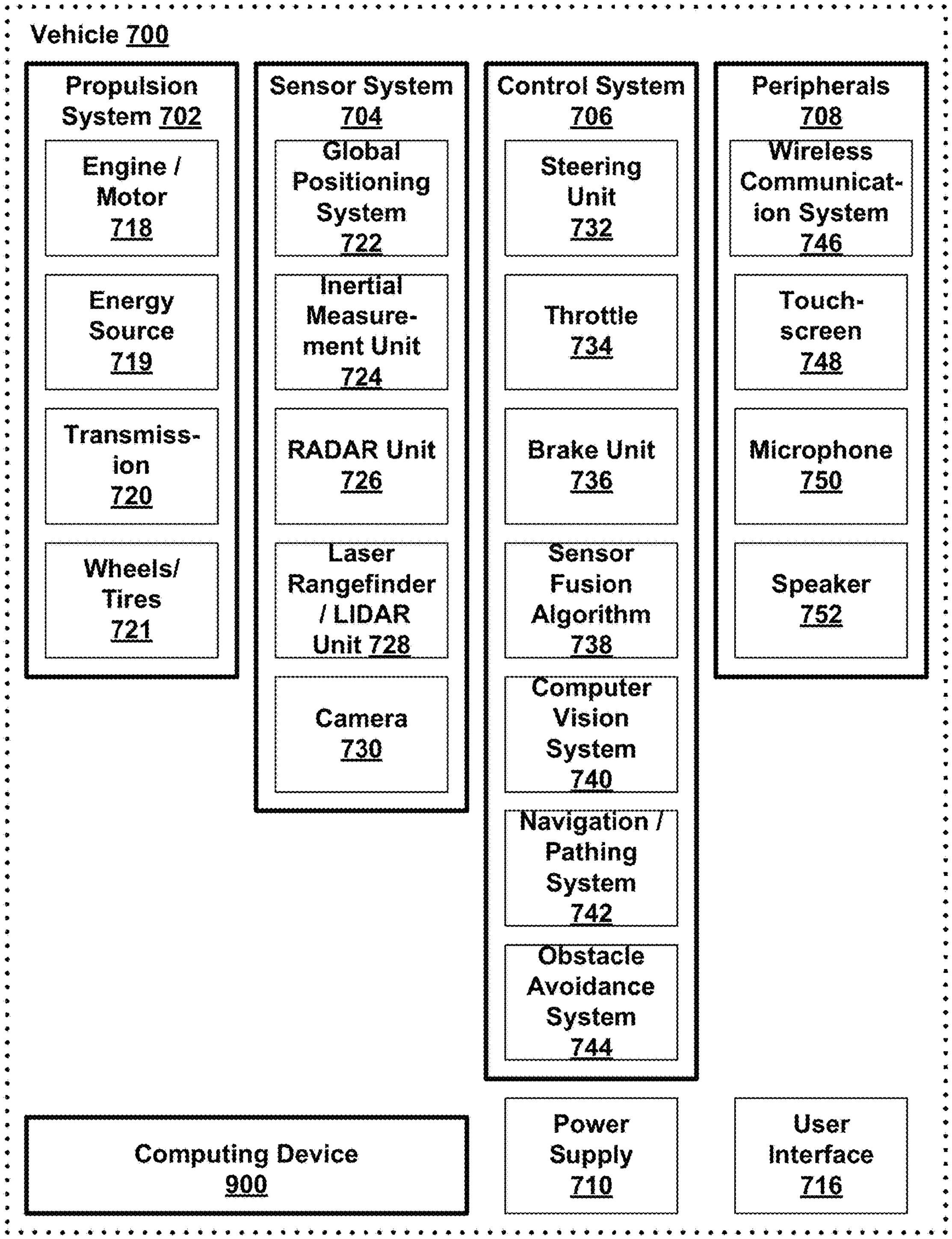
FIG. 7 is a functional block diagram illustrating a vehicle, according to an example embodiment.

FIG. 7 is a functional block diagram illustrating a vehicle 700, according to an example embodiment. The vehicle 700 can be configured to operate fully or partially in an autonomous mode. For example, the vehicle 700 can control itself while in the autonomous mode, and can be operable to determine a current state of the vehicle and its environment, determine a predicted behavior of at least one other vehicle in the environment, determine a confidence level that can correspond to a likelihood of the at least one other vehicle to perform the predicted behavior, and control the vehicle 700 based on the determined information. While in autonomous mode, the vehicle 700 can be configured to operate without human interaction.

The vehicle 700 can include various subsystems such as a propulsion system 702, a sensor system 704, a control system 706, one or more peripherals 708, as well as a power supply 710, a computer system 900, and a user interface 716. The vehicle 700 can include more or fewer subsystems and each subsystem can include multiple aspects. Further, each of the subsystems and aspects of vehicle 700 can be interconnected. Thus, one or more of the described functions of the vehicle 700 can be divided up into additional functional or physical components, or combined into fewer functional or physical components. In some further examples, additional functional and/or physical components can be added to the examples illustrated by FIG. 7.

The propulsion system 702 can include components operable to provide powered motion for the vehicle 700. In an example embodiment, the propulsion system 702 can include an engine/motor 718, an energy source 719, a transmission 720, and wheels/tires 721. The engine/motor 718 can be any combination of an internal combustion engine, an electric motor, steam engine, Stirling engine, or other types of engines and/or motors. In some embodiments, the engine/motor 718 can be configured to convert energy source 719 into mechanical energy. In some embodiments, the propulsion system 702 can include multiple types of engines and/or motors. For instance, a gas-electric hybrid car can include a gasoline engine and an electric motor. Other examples are possible.

The energy source 719 can represent a source of energy that can, in full or in part, power the engine/motor 718. That is, the engine/motor 718 can be configured to convert the energy source 719 into mechanical energy. Examples of energy sources 719 include gasoline, diesel, other petroleum-based fuels, propane, other compressed gas-based fuels, ethanol, solar panels, batteries, and other sources of electrical power. The energy source(s) 719 can additionally or alternatively include any combination of fuel tanks, batteries, capacitors, and/or flywheels. The energy source 719 can also provide energy for other systems of the vehicle 700.

The transmission 720 can include aspects that are operable to transmit mechanical power from the engine/motor 718 to the wheels/tires 721. To this end, the transmission 720 can include a gearbox, clutch, differential, and drive shafts. The transmission 720 can include other aspects. The drive shafts can include one or more axles that can be coupled to the one or more wheels/tires 721.

The wheels/tires 721 of vehicle 700 can be configured in various formats, including a unicycle, bicycle/motorcycle, tricycle, or car/truck four-wheel format. Other wheel/tire geometries are possible, such as those including six or more wheels. Any combination of the wheels/tires 721 of vehicle 700 can be operable to rotate differentially with respect to other wheels/tires 721. The wheels/tires 721 can represent at least one wheel that is fixedly attached to the transmission 720 and at least one tire coupled to a rim of the wheel that can make contact with the driving surface. The wheels/tires 721 can include any combination of metal and rubber, or another combination of materials.

The sensor system 704 can include a number of sensors configured to sense information about an environment of the vehicle 700. For example, the sensor system 704 can include a Global Positioning System (GPS) 722, an inertial measurement unit (IMU) 724, a RADAR unit 726, a laser rangefinder/LIDAR unit 728, and a camera 730. The sensor system 704 can also include sensors configured to monitor internal systems of the vehicle 700 (e.g., $O_2$ monitor, fuel gauge, engine oil temperature). Other sensors are possible as well.

One or more of the sensors included in sensor system 704 can be configured to be actuated separately and/or collectively in order to modify a position and/or an orientation of the one or more sensors.

The GPS 722 can be any sensor configured to estimate a geographic location of the vehicle 700. To this end, GPS 722 can include a transceiver operable to provide information regarding the position of the vehicle 700 with respect to the Earth.

The IMU 724 can include any combination of sensors (e.g., accelerometers and gyroscopes) configured to sense position and orientation changes of the vehicle 700 based on inertial acceleration.

The RADAR unit 726 can represent a system that utilizes radio signals to sense objects within the local environment of the vehicle 700. In some embodiments, in addition to sensing the objects, the RADAR unit 726 can additionally be configured to sense the speed and/or heading of the objects.

Similarly, the laser rangefinder or LIDAR unit 728 can be any sensor configured to sense objects in the environment in which the vehicle 700 is located using lasers. In an example embodiment, the laser rangefinder/LIDAR unit 728 can include one or more laser sources, a laser scanner, and one or more detectors, among other system components. The laser rangefinder/LIDAR unit 728 can be configured to operate in a coherent (e.g., using heterodyne detection) or an incoherent detection mode.

The camera 730 can include one or more devices configured to capture a plurality of images of the environment of the vehicle 700. The camera 730 can be a still camera or a video camera.

The control system 706 can be configured to control operation of the vehicle 700 and its components. Accordingly, the control system 706 can include various aspects include steering unit 732, throttle 734, brake unit 736, a sensor fusion algorithm 738, a computer vision system 740, a navigation/pathing system 742, and an obstacle avoidance system 744.

The steering unit 732 can represent any combination of mechanisms that can be operable to adjust the heading of vehicle 700.

The throttle 734 can be configured to control, for instance, the operating speed of the engine/motor 718 and, in turn, control the speed of the vehicle 700.

The brake unit 736 can include any combination of mechanisms configured to decelerate the vehicle 700. The brake unit 736 can use friction to slow the wheels/tires 121. In other embodiments, the brake unit 736 can convert the kinetic energy of the wheels/tires 721 to electric current. The brake unit 736 can take other forms as well.

The sensor fusion algorithm 738 can be an algorithm (or a computer program product storing an algorithm) configured to accept data from the sensor system 704 as an input. The data can include, for example, data representing information sensed at the sensors of the sensor system 704. The sensor fusion algorithm 738 can include, for instance, a Kalman filter, Bayesian network, or other algorithm. The sensor fusion algorithm 738 can further provide various assessments based on the data from sensor system 704. In an example embodiment, the assessments can include evaluations of individual objects and/or features in the environment of vehicle 700, evaluation of a particular situation, and/or evaluate possible impacts based on the particular situation. Other assessments are possible.

The computer vision system 740 can be any system operable to process and analyze images captured by camera 730 in order to identify objects and/or features in the environment of vehicle 700 that can include traffic signals, road way boundaries, and obstacles. The computer vision system 740 can use an object recognition algorithm, a Structure From Motion (SFM) algorithm, video tracking, and other computer vision techniques. In some embodiments, the computer vision system 740 can be additionally configured to map an environment, track objects, estimate the speed of objects, etc.

The navigation and pathing system 742 can be any system configured to determine a driving path for the vehicle 700. The navigation and pathing system 742 can additionally be configured to update the driving path dynamically while the vehicle 700 is in operation. In some embodiments, the navigation and pathing system 742 can be configured to incorporate data from the sensor fusion algorithm 738, the GPS 722, and one or more predetermined maps so as to determine the driving path for vehicle 700.

The obstacle avoidance system 744 can represent a control system configured to identify, evaluate, and avoid or otherwise negotiate potential obstacles in the environment of the vehicle 700.

The control system 706 can additionally or alternatively include components other than those shown and described.

Peripherals 708 can be configured to allow interaction between the vehicle 700 and external sensors, other vehicles, other computer systems, and/or a user. For example, peripherals 708 can include a wireless communication system 746, a touchscreen 748, a microphone 750, and/or a speaker 752.

In an example embodiment, the peripherals 708 can provide, for instance, means for a user of the vehicle 700 to interact with the user interface 716. To this end, the touchscreen 748 can provide information to a user of vehicle 700. The user interface 716 can also be operable to accept input from the user via the touchscreen 748. The touchscreen 748 can be configured to sense at least one of a position and a movement of a user's finger via capacitive sensing, resistance sensing, or a surface acoustic wave process, among other possibilities. The touchscreen 748 can be capable of sensing finger movement in a direction parallel or planar to the touchscreen surface, in a direction normal to the touchscreen surface, or both, and can also be capable of sensing a level of pressure applied to the touchscreen surface. The touchscreen 748 can be formed of one or more translucent or transparent insulating layers and one or more translucent or transparent conducting layers. The touchscreen 748 can take other forms as well.

In other instances, the peripherals 708 can provide means for the vehicle 700 to communicate with devices within its environment. The microphone 750 can be configured to receive audio (e.g., a voice command or other audio input) from a user of the vehicle 700. Similarly, the speakers 752 can be configured to output audio to the user of the vehicle 700.

In one example, the wireless communication system 746 can be configured to wirelessly communicate with one or more devices directly or via a communication network. For example, wireless communication system 746 can use 3G cellular communication, such as CDMA, EVDO, GSM/GPRS, or 4G cellular communication, such as WiMAX or LTE. Alternatively, wireless communication system 746 can communicate with a wireless local area network (WLAN), for example, using WiFi. In some embodiments, wireless communication system 746 can communicate directly with a device, for example, using an infrared link, Bluetooth, or ZigBee. Other wireless protocols, such as various vehicular communication systems, are possible within the context of the disclosure. For example, the wireless communication system 746 can include one or more dedicated short range communications (DSRC) devices that can include public and/or private data communications between vehicles and/or roadside stations.

The power supply 710 can provide power to various components of vehicle 700 and can represent, for example, a rechargeable lithium-ion or lead-acid battery. In some embodiments, one or more banks of such batteries can be configured to provide electrical power. Other power supply materials and configurations are possible. In some embodiments, the power supply 710 and energy source 719 can be implemented together, as in some all-electric cars.

Many or all of the functions of vehicle 700 can be controlled by computer system 900, discussed in detail below with respect to FIG. 9. Computer system 900 can represent one or more computing devices that can serve to control individual components or subsystems of the vehicle 700 in a distributed fashion.

The vehicle 700 can include a user interface 716 for providing information to or receiving input from a user of vehicle 700. The user interface 716 can control or enable control of content and/or the layout of interactive images that can be displayed on the touchscreen 748. Further, the user interface 716 can include one or more input/output devices within the set of peripherals 708, such as the wireless communication system 746, the touchscreen 748, the microphone 750, and the speaker 752.

The computer system 900 can control the function of the vehicle 700 based on inputs received from various subsystems (e.g., propulsion system 702, sensor system 704, and control system 706), as well as from the user interface 716. For example, the computer system 900 can utilize input from the control system 706 in order to control the steering unit 732 to avoid an obstacle detected by the sensor system 704 and the obstacle avoidance system 744. In an example embodiment, the computer system 900 can control many aspects of the vehicle 700 and its subsystems.

Although FIG. 7 shows various components of vehicle 700, i.e., wireless communication system 746 and computer system 900, as being integrated into the vehicle 700, one or more of these components can be mounted or associated separately from the vehicle 700. For example, computer system 900 can, in part or in full, exist separate from the vehicle 700. Thus, the vehicle 700 can be provided in the form of device aspects that can be located separately or together. The device aspects that make up vehicle 700 can be communicatively coupled together in a wired and/or wireless fashion.

Figure 8:
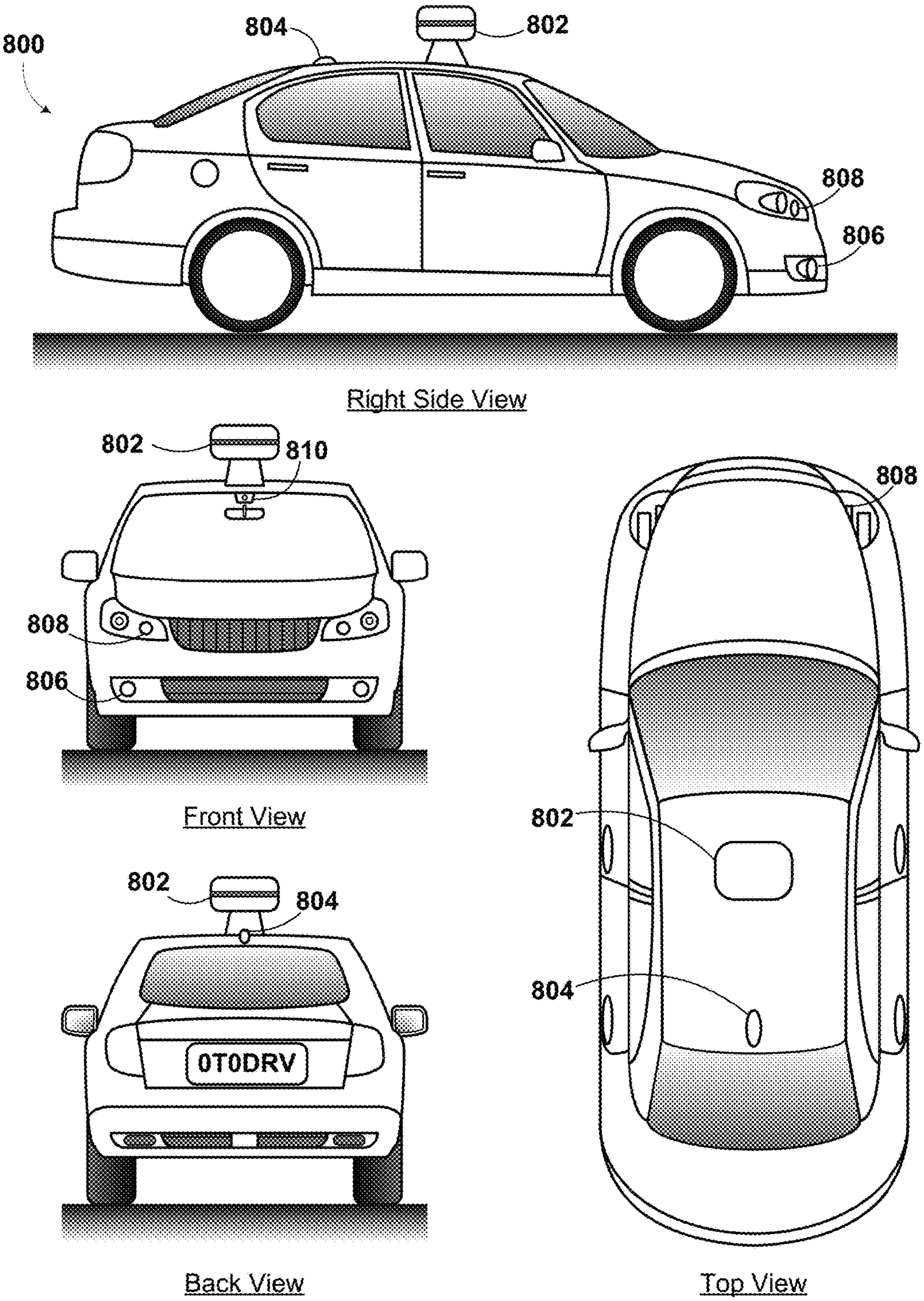
FIG. 8 shows a vehicle 800 that can be similar or identical to the vehicle described with respect to FIG. 7, in accordance with an example embodiment.

FIG. 8 shows a vehicle 800 that can be similar or identical to vehicle 700 described with respect to FIG. 7, in accordance with an example embodiment. Although vehicle 800 is illustrated in FIG. 8 as a car, other embodiments are possible. For instance, the vehicle 800 can represent a truck, a van, a semi-trailer truck, a motorcycle, a golf cart, an off-road vehicle, or a farm vehicle, among other examples.

In some embodiments, vehicle 800 can include a sensor unit 802, a wireless communication system 804, a LIDAR unit 806, a laser rangefinder unit 808, and a camera 810. The aspects of vehicle 800 can include some or all of the aspects described for FIG. 7.

The sensor unit 802 can include one or more different sensors configured to capture information about an environment of the vehicle 800. For example, sensor unit 802 can include any combination of cameras, RADARs, LIDARs, range finders, and acoustic sensors. Other types of sensors are possible. In an example embodiment, the sensor unit 802 can include one or more movable mounts that can be operable to adjust the orientation of one or more sensors in the sensor unit 802. In one embodiment, the movable mount can include a rotating platform that can scan sensors so as to obtain information from each direction around the vehicle 800. In another embodiment, the movable mount of the sensor unit 802 can be moveable in a scanning fashion within a particular range of angles and/or azimuths. The sensor unit 802 can be mounted atop the roof of a car, for instance, however other mounting locations are possible. Additionally, the sensors of sensor unit 802 can be distributed in different locations and need not be collocated in a single location. Some possible sensor types and mounting locations include LIDAR unit 806 and laser rangefinder unit 808. Furthermore, each sensor of sensor unit 802 can be configured to be moved or scanned independently of other sensors of sensor unit 802.

The wireless communication system 804 can be located on a roof of the vehicle 800 as depicted in FIG. 8. Alternatively, the wireless communication system 804 can be located, fully or in part, elsewhere. The wireless communication system 804 can include wireless transmitters and receivers that can be configured to communicate with devices external or internal to the vehicle 800. Specifically, the wireless communication system 804 can include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 810 can be any camera (e.g., a still camera, a video camera, etc.) configured to capture a plurality of images of the environment of the vehicle 800. To this end, the camera 810 can be configured to detect visible light, or can be configured to detect light from other portions of the spectrum, such as infrared or ultraviolet light. Other types of cameras are possible as well.

The camera 810 can be a two-dimensional detector, or can have a three-dimensional spatial range. In some embodiments, the camera 810 can be, for example, a range detector configured to generate a two-dimensional image indicating a distance from the camera 810 to a number of points in the environment. To this end, the camera 810 can use one or more range detecting techniques. For example, the camera 810 can use a structured light technique in which the vehicle 800 illuminates an object in the environment with a predetermined light pattern, such as a grid or checkerboard pattern and uses the camera 810 to detect a reflection of the predetermined light pattern off the object. Based on distortions in the reflected light pattern, the vehicle 800 can determine the distance to the points on the object. The predetermined light pattern can comprise infrared light, or light of another wavelength. As another example, the camera 810 can use a laser scanning technique in which the vehicle 800 emits a laser and scans across a number of points on an object in the environment. While scanning the object, the vehicle 800 uses the camera 810 to detect a reflection of the laser off the object for each point. Based on a length of time it takes the laser to reflect off the object at each point, the vehicle 800 can determine the distance to the points on the object. As yet another example, the camera 810 can use a time-of-flight technique in which the vehicle 800 emits a light pulse and uses the camera 810 to detect a reflection of the light pulse off an object at a number of points on the object. In particular, the camera 810 can include a number of pixels, and each pixel can detect the reflection of the light pulse from a point on the object. Based on a length of time it takes the light pulse to reflect off the object at each point, the vehicle 800 can determine the distance to the points on the object. The light pulse can be a laser pulse. Other range detecting techniques are possible as well, including stereo triangulation, sheet-of-light triangulation, interferometry, and coded aperture techniques, among others. The camera 810 can take other forms as well.

The camera 810 can be mounted inside a front windshield of the vehicle 800. Specifically, as illustrated, the camera 810 can capture images from a forward-looking view with respect to the vehicle 800. Other mounting locations and viewing angles of camera 810 are possible, either inside or outside the vehicle 800.

The camera 810 can have associated optics that can be operable to provide an adjustable field of view. Further, the camera 810 can be mounted to vehicle 800 with a movable mount that can be operable to vary a pointing angle of the camera 810.

Within the context of the present disclosure, the components of vehicle 700 and/or vehicle 800 can be configured to work in an interconnected fashion with other components within or outside their respective systems. For instance, the camera 730 can capture a plurality of images that can represent sensor data relating to an environment of the vehicle 700 operating in an autonomous mode. The environment can include another vehicle blocking a known traffic signal location ahead of the vehicle 700. Based on the plurality of images, an inference system (which can include the computer system 900, sensor system 704, and control system 706) can infer that the unobservable traffic signal is red based on sensor data from other aspects of the environment (for instance images indicating the blocking vehicle's brake lights are on). Based on the inference, the computer system 900 and propulsion system 702 can act to control the vehicle 700.

Computing Device Architecture

Figure 9A:
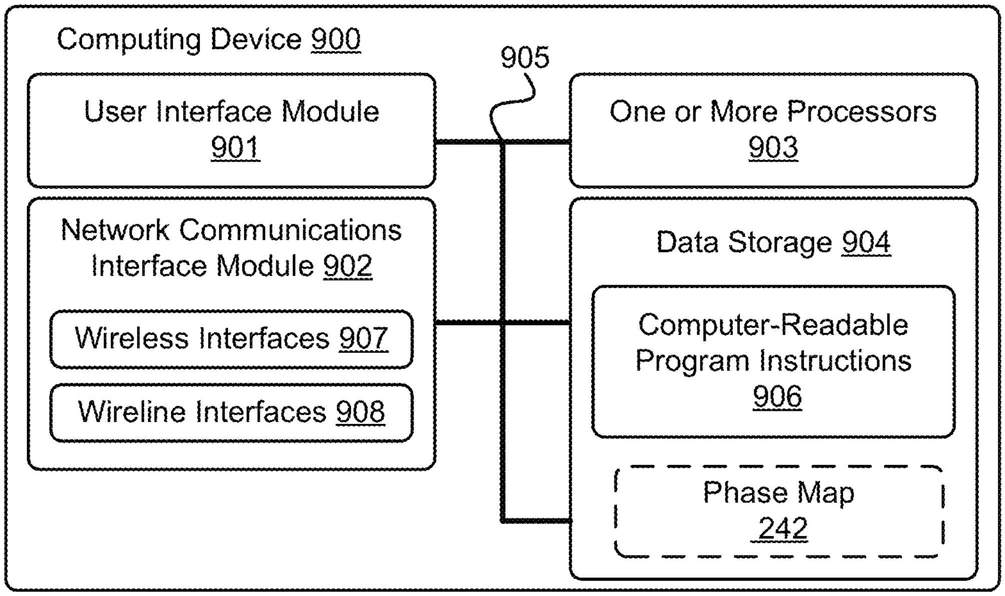
FIG. 9A is a block diagram of a computing device, in accordance with an example embodiment.

FIG. 9A is a block diagram of computing device 900, in accordance with an example embodiment. In particular, computing device 900 shown in FIG. 9A can be configured to perform one or more functions of mobile device 250, application 270, relaying servers 240, 340, 440, 540, 640, phase maps 242, 342, 442, 542, 642, network 238, and signal controllers 320, 420, and 620. Computing device 900 may include a user interface module 901, a network-communication interface module 902, one or more processors 903, and data storage 904, all of which may be linked together via a system bus, network, or other connection mechanism 905.

User interface module 901 can be operable to send data to and/or receive data from external user input/output devices. For example, user interface module 901 can be configured to send and/or receive data to and/or from user input devices such as a keyboard, a keypad, a touch screen, a computer mouse, a track ball, a joystick, a camera, a voice recognition module, and/or other similar devices. User interface module 901 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 901 can also be configured to generate audible output(s), such as a speaker, speaker jack, audio output port, audio output device, earphones, and/or other similar devices.

Network-communications interface module 902 can include one or more wireless interfaces 907 and/or one or more wireline interfaces 908 that are configurable to communicate via a network, such as network 238 shown in FIG. 8. Wireless interfaces 907 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 908 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 902 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 903 can include one or more general purpose processors and/or one or more special purpose processors (e.g., digital signal processors, application specific integrated circuits, etc.). Processors 903 can be configured to execute computer-readable program instructions 906 that are contained in the data storage 904 and/or other instructions as described herein.

Data storage 904 can include one or more computer-readable storage media that can be read and/or accessed by at least one of processors 903. The one or more computer-readable storage media can include volatile and/or non-volatile storage components, such as optical, magnetic, organic or other memory or disc storage, which can be integrated in whole or in part with at least one of processors 903. In some embodiments, data storage 904 can be implemented using a single physical device (e.g., one optical, magnetic, organic or other memory or disc storage unit), while in other embodiments, data storage 904 can be implemented using two or more physical devices.

Data storage 904 can include computer-readable program instructions 906, phase map 242, and perhaps additional data. Phase map 242 can store information about roads, road features, and aspects and respond to queries and information requests, as discussed above in the context of phase maps in FIGS. 2-6. In some embodiments, data storage 904 can additionally include storage required to perform at least part of the herein-described methods and techniques and/or at least part of the functionality of the herein-described devices and networks.

Cloud-Based Servers

Figure 9B:
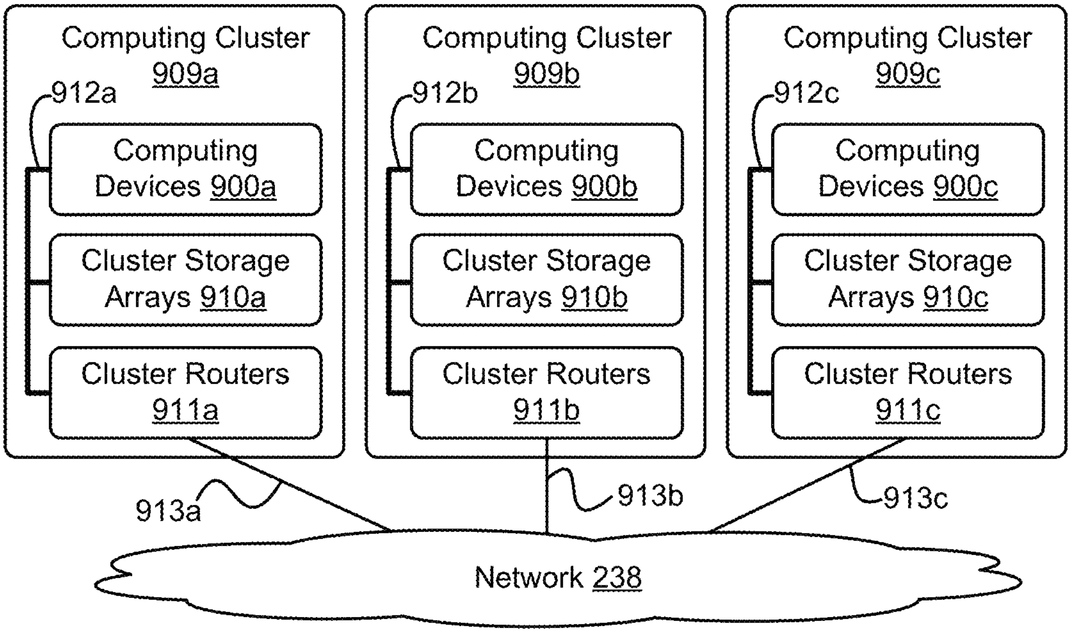
FIG. 9B depicts a network of computing clusters arranged as a cloud-based server system, in accordance with an example embodiment.

FIG. 9B depicts a network 238 of computing clusters 909*a*, 909*b*, 909*c* arranged as a cloud-based server system, in accordance with an example embodiment. Relaying server 240, 340, 440, 540, 640 and/or phase map 242, 342, 442, 542, 642 can be cloud-based devices that store program logic and/or data of cloud-based applications and/or services. In some embodiments, server devices 508 and/or 510 can be a single computing device residing in a single computing center. In other embodiments, server device 508 and/or 510 can include multiple computing devices in a single computing center, or even multiple computing devices located in multiple computing centers located in diverse geographic locations. For example, FIG. 5 depicts each of server devices 508 and 510 residing in different physical locations.

In some embodiments, data and services at server devices 508 and/or 510 can be encoded as computer readable information stored in non-transitory, tangible computer readable media (or computer readable storage media) and accessible by programmable devices 504*a*, 504*b*, and 504*c*, and/or other computing devices. In some embodiments, data at server device 508 and/or 510 can be stored on a single disk drive or other tangible storage media, or can be implemented on multiple disk drives or other tangible storage media located at one or more diverse geographic locations.

FIG. 9B depicts a cloud-based server system in accordance with an example embodiment. In FIG. 9B, the functions of relaying server 240, 340, 440, 540, 640 and/or phase map 242, 342, 442, 542, 642 can be distributed among three computing clusters 909*a*, 909*b*, and 909*c*. Computing cluster 909*a* can include one or more computing devices 900*a*, cluster storage arrays 910*a*, and cluster routers 911*a* connected by a local cluster network 912*a*. Similarly, computing cluster 909*b* can include one or more computing devices 900*b*, cluster storage arrays 910*b*, and cluster routers 911*b* connected by a local cluster network 912*b*. Likewise, computing cluster 909*c* can include one or more computing devices 900*c*, cluster storage arrays 910*c*, and cluster routers 911*c* connected by a local cluster network 912*c*.

In some embodiments, each of the computing clusters 909*a*, 909*b*, and 909*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 909*a*, for example, computing devices 900*a* can be configured to perform various computing tasks of relaying server 240, 340, 440, 540, 640. In one embodiment, the various functionalities of relaying server 240, 340, 440, 540, 640 can be distributed among one or more of computing devices 900*a*, 900*b*, and 900*c*. Computing devices 900*b* and 900*c* in computing clusters 909*b* and 909*c* can be configured similarly to computing devices 900*a* in computing cluster 909*a*. On the other hand, in some embodiments, computing devices 900*a*, 900*b*, and 900*c* can be configured to perform different functions.

In some embodiments, computing tasks and stored data associated with relaying server 240, 340, 440, 540, 640 and/or phase map 242, 342, 442, 542, 642 can be distributed across computing devices 900*a*, 900*b*, and 900*c* based at least in part on the processing requirements of relaying server 240, 340, 440, 540, 640 and/or phase map 242, 342, 442, 542, 642, the processing capabilities of computing devices 900*a*, 900*b*, and 900*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 910*a*, 910*b*, and 910*c* of the computing clusters 909*a*, 909*b*, and 909*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 508 and/or 510 can be distributed across computing devices 900*a*, 900*b*, and 900*c* of computing clusters 909*a*, 909*b*, and 909*c*, various active portions and/or backup portions of these components can be distributed across cluster storage arrays 910*a*, 910*b*, and 910*c*. For example, some cluster storage arrays can be configured to store the data of relaying server 240, 340, 440, 540, 640, while other cluster storage arrays can store data of phase map 242, 342, 442, 542, 642. Additionally, some cluster storage arrays can be configured to store backup versions of data stored in other cluster storage arrays.

The cluster routers 911*a*, 911*b*, and 911*c* in computing clusters 909*a*, 909*b*, and 909*c* can include networking equipment configured to provide internal and external communications for the computing clusters. For example, the cluster routers 911*a* in computing cluster 909*a* can include one or more internet switching and routing devices configured to provide (i) local area network communications between the computing devices 900*a* and the cluster storage arrays 901*a* via the local cluster network 912*a*, and (ii) wide area network communications between the computing cluster 909*a* and the computing clusters 909*b* and 909*c* via the wide area network connection 913*a* to network 238. Cluster routers 911*b* and 911*c* can include network equipment similar to the cluster routers 911*a*, and cluster routers 911*b* and 911*c* can perform similar networking functions for computing clusters 909*b* and 909*b* that cluster routers 911*a* perform for computing cluster 909*a*.

In some embodiments, the configuration of the cluster routers 911*a*, 911*b*, and 911*c* can be based at least in part on the data communication requirements of the computing devices and cluster storage arrays, the data communications capabilities of the network equipment in the cluster routers 911*a*, 911*b*, and 911*c*, the latency and throughput of local networks 912*a*, 912*b*, 912*c*, the latency, throughput, and cost of wide area network links 913*a*, 913*b*, and 913*c*, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:

receiving, at a server, one or more reports from at least one information source, each respective report comprising source data indicative of one or more aspects of a plurality of objects at or proximate to a road intersection being approached by a vehicle at a respective time, wherein the plurality of objects include at least a traffic signal controlling traffic through the road intersection;

storing at least the source data from the one or more reports at the server;

constructing a phase map for the road intersection from at least the source data using the server, wherein the phase map represents a current status of the plurality of objects relative to the road intersection and a prediction of future status of the plurality of objects relative to the road intersection at one or more future times, wherein the prediction of future status of the traffic signal includes indicating a beginning time and an end time between which the traffic signal will di splay a particular color;

determining that, for the traffic signal controlling traffic through the road intersection, a drift has occurred between two consecutive days in the beginning time at which the traffic signal will display the particular color;

determining an amount of the drift in the beginning time between two consecutive days;

determining a level of certainty for the prediction of future status of the plurality of objects including the traffic signal, wherein the level of certainty is based at least on the determined amount of drift;

receiving, at the server, an information request by the vehicle related to the road intersection;

in response to the information request, the server generating, based on the phase map, an information response including the current status of the plurality of objects relative to the road intersection, the prediction of future status of the plurality of objects relative to the road intersection at a specified time at which the vehicle reaches the road intersection, and the level of certainty; and sending the information response from the server to the vehicle.

2. The method of claim 1, wherein the prediction of the future status comprises a predicted red/yellow/green-light status of the traffic signal at the specified time at which the vehicle reaches the intersection.

3. The method of claim 1, wherein the prediction of the future status of the plurality of objects comprises a prediction of whether an object of the plurality of objects will be in a path of the vehicle at the specified time at which the vehicle reaches the intersection.

4. The method of claim 1, wherein the one or more reports further comprise information about a condition feature associated with the road intersection, and wherein the condition feature comprises at least one condition selected from the group consisting of a traffic condition, a construction condition, a weather-related condition, and an accident-related condition.

5. The method of claim 1, wherein the source data comprises data selected from the group consisting of data about another vehicle at or proximate to the road intersection, data about a pedestrian crossing or about to cross the road intersection, data about the traffic signal controlling traffic through the road intersection, data about road construction proximate to the road intersection, data about a timer associated with the road intersection, and data about a blockage of the road intersection.

6. The method of claim 1, wherein generating the information response to the information request comprises:

obtaining one or more data items from the source data; and for each data item of the one or more data items:

determining an age of the data item, comparing the age of the data item to a threshold age, and in response to the age of the data item being less than the threshold age, using the data item to determine the response data.

7. The method of claim 6, wherein the traffic signal is configured to sequence through a series of signals during a predetermined traffic-cycle time, and wherein the threshold age is based on the traffic-cycle time.

8. The method of claim 7, wherein the level of certainty indicates a period of time different from a respective period of time between the beginning time and the end time.

9. The method of claim 1, wherein the phase map represents objects that are within a predetermined distance in either direction away from the road intersection, and discards objects that are beyond the predetermined distance.

10. The method of claim 1, wherein the plurality of objects includes an object approaching the road intersection, wherein the prediction of future status of the plurality of objects relative to the road intersection indicates whether the object will obstruct the vehicle at specified time at which the vehicle reaches the road intersection, and wherein the level of certainty represents a probability that the object will obstruct the vehicle at the specified time.

11. The method of claim 10, wherein the current status of the object indicates that the object is occluded from the vehicle.

12. The method of claim 10, wherein the object is a pedestrian or a bicycle.

* * * * *